US008958819B2

(12) United States Patent
Lee et al.

(10) Patent No.: US 8,958,819 B2
(45) Date of Patent: Feb. 17, 2015

(54) FEMTO-ASSISTED LOCATION ESTIMATION IN MACRO-FEMTO HETEROGENEOUS NETWORKS

(71) Applicant: Transpacific IP Management Group Ltd., Taiwan (CN)

(72) Inventors: Ke-Ting Lee, Taiwan (CN); Po-Hsuan Tseng, Taiwan (CN); Chien-Hua Chen, Taiwan (CN); Kai-Ten Feng, Taiwan (CN)

(73) Assignee: Transpacific IP Management Group Ltd., Taipei (TW)

( * ) Notice: Subject to any disclaimer, the term of this patent is extended or adjusted under 35 U.S.C. 154(b) by 0 days.

(21) Appl. No.: 13/924,458

(22) Filed: Jun. 21, 2013

(65) Prior Publication Data

US 2014/0162686 A1    Jun. 12, 2014

Related U.S. Application Data

(60) Provisional application No. 61/735,875, filed on Dec. 11, 2012.

(51) Int. Cl.
*H04W 24/00* (2009.01)
*H04W 64/00* (2009.01)

(52) U.S. Cl.
CPC ................................ *H04W 64/003* (2013.01)
USPC .................. 455/456.1; 455/404.2; 455/422.1; 455/423

(58) Field of Classification Search
CPC ... H04W 64/00; H04W 4/02; H04L 29/08957
USPC .......................... 455/456.1, 404.2, 422.1, 423
See application file for complete search history.

(56) References Cited

U.S. PATENT DOCUMENTS

2011/0092222 A1*  4/2011  Kuo et al. .................. 455/456.1
2014/0274111 A1*  9/2014  Edge et al. ................. 455/456.1

OTHER PUBLICATIONS

Federal Communications Commission. "Enhanced 9-1-1-Wireless Services." Published online at [http://transition.fcc.gov/pshs/services/911-services/enhanced911/], retrieved Oct. 18, 2013, 1 page.
Zhao, "Standardization of mobile phone positioning for 3G systems," IEEE Communications Magazine • Jul. 2002, vol. 40, No. 7, pp. 108-116.
Gustafsson, et al., "Mobile positioning using wireless networks: Possibilities and fundamental limitations based on available wireless network measurements," IEEE Signal Process. Mag., vol. 22, No. 4, pp. 41-53, Jul. 2005. 13 pages.

(Continued)

*Primary Examiner* — Nghi H Ly
(74) *Attorney, Agent, or Firm* — Amin, Turocy & Watson, LLP

(57) ABSTRACT

The disclosed subject matter relates to a wireless communications environment. Femto-assisted location estimation schemes can determine UE location information based on information from either macro base stations or femto base stations in a LTE-A heterogeneous network. Positions information for a femto base station can be employed even though the exact positions of fBS may not be available. The femto base station position information can be depicted as a probabilistic distribution. Bayesian estimation based on TDOA and utilization of a particle filter can facilitate determining UE location information. Furthermore, a simplified scheme can reduce computational complexity.

37 Claims, 15 Drawing Sheets

(56) References Cited

OTHER PUBLICATIONS

3GPP. "Evolved Universal Terrestrial Radio Access (E-UTRA); FDD Home eNode B (HeNB) Radio Frequency (RF) requirements analysis", TR36.921, V11.0.0 (Release 11), Sep. 2012. 45 pages.
B. G. Yang, K. B. Letaief, R. S. Cheng, and Z. G. Cao, "Timing recovery for OFDM transmission," IEEE Journal on Selected Areas in Communications, vol. 18, Issue: 11, pp. 2278-2291, Nov. 2000.
S. M. Kay, "Fundamentals of Statistical Signal Processing: Estimation Theory". Prentice Hall, 1993.
Arulampalam, et al., "A tutorial on particle filters for online nonlinear/non-gaussian bayesian tracking," IEEE Trans. Signal Process. vol. 50, No. 2, pp. 174-188, Feb. 2002. 15 pages.
3GPP. "Evolved Universal Terrestrial Radio Access (E-UTRA)—Physical Channels and Modulation", TS36.211, V10.5.0 (Release 10), Jul. 2012. 103 pages.
M. A. Amin and S. Fischer, "Position location of LTE femtocells deployed in a cluster," 2012 International Conference on Localization and Gnss (ICL-GNSS), Jun. 2012, pp. 1-6.
C. Gentner, E. Munoz, M. Khider, E. Staudinger, S. Sand, and A. Dammann, "Particle filter based positioning with 3GPP-LTE in indoor environments," 2012 IEEE/ION Position Location and Navigation Symposium (PLANS), Apr. 2012, pp. 301-308.
Wymeersch, et al., "Cooperative localization in wireless networks," Proc. IEEE, vol. 97, No. 2, pp. 427-450, Feb. 2009.

* cited by examiner

FEMTO-ASSISTED LOCATION ESTIMATION IN MACRO-FEMTO HETEROGENEOUS NETWORKS

RELATED APPLICATIONS

This application claims priority to U.S. Provisional Application No. 61/735,875, filed 11 Dec. 2012, which is hereby incorporated by reference in its entirety.

TECHNICAL FIELD

The various embodiments of the subject disclosure relate generally to heterogeneous networks, e.g., to location estimation in macro-femto heterogeneous networks associated with wireless communications.

BACKGROUND

Location estimation plays a valuable role in various applications, such as navigation, target tracking, and emergency services. Wireless devices can supply high positioning accuracy such that users can acquire better location-based services (LBS). Localization of user equipment (UE) has attracted attention in wireless communications after the implementation of Enhanced 911 (E-911) regulations adopted by Federal Communications Commission (FCC). In outdoor and line-of-sight (LOS) environments, a global positioning system (GPS) can provide UEs position with relatively accurate precision through well known the schemes. However, GPS techniques generally do not provide reasonable location estimation accuracy for UE position under non-line-of-sight (NLOS) conditions, especially in heavily obscured environments, e.g., indoor environments, environments with many tall and close buildings, etc.

Long term evolution advanced (LTE-A) wireless communications systems, such as those that use orthogonal frequency division multiple access (OFDMA) technologies to efficiently handle broadband communication, have been proposed to achieve high data rates, high spectral efficiency, and greater capacity in wireless communications networks. To fulfill the rising data communication requirement in indoor environments, the architecture can be adapted into a heterogeneous network (HetNet) which can be adopted in LTE-A systems to include both macro base station (mBS) and femto BS (fBS). Macro base stations and femto base stations forming a HetNet can serve to help mitigate poor connectivity that can occur between a macro base stations and UEs in wireless network that does not include femto base stations. Femto base stations can be include short-range base stations which service UEs. As such, femto base stations can provide wireless network coverage for UEs in indoor environments or other NLOS environments. The development of mBS/fBS HetNet architectures can benefit many applications, such as LBS in indoor environments.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that includes a memory and processor that can facilitate execution of instructions to perform operations including receiving base station information related to a user equipment and receiving particle information for a first set of particles corresponding to possible user equipment locations. The operations can further comprise determining user equipment location information based on a first particle filtering scheme for particle filtering the first set of particles.

In a further embodiment, the disclosed subject matter can be in the form of computer-executable instructions stored on a computer-readable storage medium. The computer-executable instructions can include receiving femto base station timing information related to a user equipment, receiving macro base station timing information related to the user equipment, and receiving particle information for a first set of particles corresponding to possible user equipment locations. The instructions can further include determining user equipment location information based on a first particle filtering algorithm for particle filtering the first set of particles, the first particle filtering algorithm employing the femto base station timing information and the macro base station timing information.

In another embodiment, the disclosed subject matter can be in the form of a method. The method can include receiving base station information related to a user equipment, and receiving particle information for a first set of particles corresponding to possible user equipment locations. The method can also include determining user equipment location information based on a first particle filtering technique for particle filtering the first set of particles based on the base station information.

In a further embodiment, the disclosed subject matter can be embodied as a system including a means for receiving first macro base station information related to a user equipment, means for receiving femto base station information related to a user equipment, and means for receiving second macro base station information related to a possible position of a femto base station device. The system can also include means for determining femto base station position information based on a first particle filtering scheme for particle filtering a first set of particles corresponding to the macro base station information related to the possible position of the femto base station device. Additionally, a means for receiving particle information for a second set of particles corresponding to possible user equipment locations can be included in the system. The system can also include a means for determining, by time difference of arrival information, user equipment location information based on a second particle filtering scheme for particle filtering the second set of particles based on the first macro base station information, second macro base station information, femto base station information, and the femto base station position information.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

Figure 1:
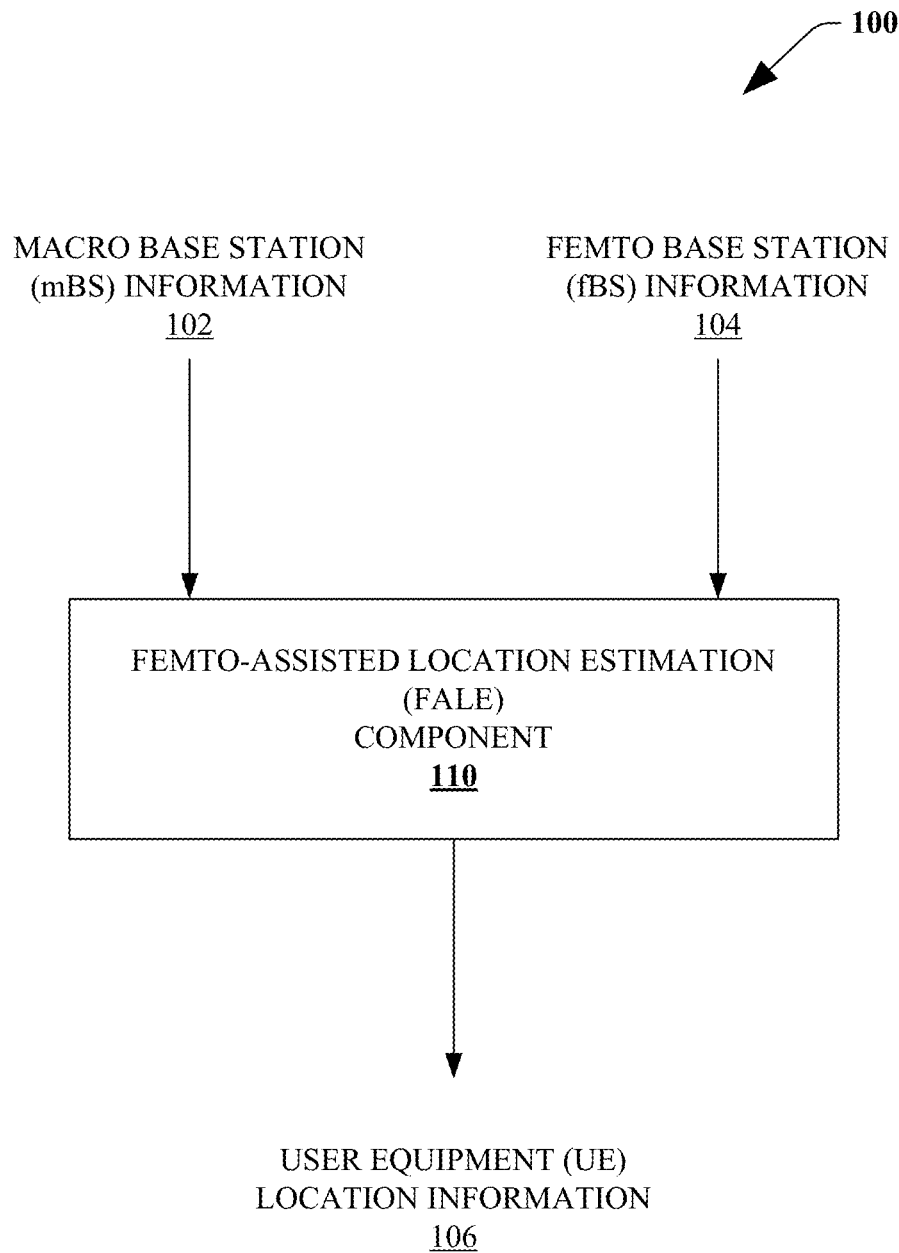
FIG. 1 is a diagram of a system that can facilitate UE location determination based on macro base station and femto base station information in accordance with an aspect of the subject matter disclosed herein.

In general, many factors can be employed in determining a UE position in a wireless network and these factors can include range estimation and angle estimation to enable user equipment (UE) location estimation. Some examples of commonly utilized factors employing range or angle estimation factors include time of arrival (TOA) schemes, time difference of arrival (TDOA) schemes, angle of arrival (AOA) schemes, and received signal strength (RSS) schemes. In practice, AOA scheme and RSS scheme measurements can be highly inaccurate under complex environments such as indoor environments. Further, TOA scheme measurements can require timing synchronization between UEs and BSs, thereby adding an additional layer of complexity. Therefore, TDOA scheme measurements can be preferable for determining UE location in wireless networks, such as cellular systems. While the disclosed subject matter can be employed for any location determination scheme or set of factors, the discussion herein is generally restricted to TDOA schemes for clarity and brevity, though it is noted that other schemes or factors also falls within the scope of the present disclosure. The LTE-A standard typically supplies a primary synchronization signal (PSS), a secondary synchronization signal (SSS) for timing synchronization purpose and a positioning reference signal (PRS) to support LBS. Note that all these synchronization signals (PSS, SSS, or PRS) typically possess no autocorrelation property which allows the receiver to estimate arrival timing with a simple correlation method. The results from timing estimation can be utilized to acquire a UE's position by way of the adoption of a location estimator, e.g., least square (LS) estimator or particle filter, wherein particle filtering can determine a distribution, e.g., a posterior distribution, etc., of a latent variable at a time specified in a defined state space, e.g., a continuous state space. In an aspect, a particle filter can be regarded as a sample-based or particle-based representation of a posterior probability distribution function. For a UE positioning problem in a LTE-A system, a UE can, for example, collect measurements and calculate positions based on downlink frames for achieving low system complexity and low power consumption.

A fBS can typically be deployed with an uncertain position as fBSs are often consumer-side equipment outside of the direct control of a wireless network operator. Location estimation schemes based on LTE can be effective even where a base station, e.g., mBS, fBS, etc., position is uncertain. As an example, a relative observed time difference of arrival (RTDOA) can be employed to determine an estimated location for the fBS. Further, a mBSs with known positions and a fBS with either known or unknown positions can be used to estimate a fBS position, such as through a LS estimator. These implementations of RTDOA can leverage cooperation between fBSs under LTE. As such, a UE position can be roughly acquired in based on a cell identification (Cell ID) scheme that can be based on a fBS serving the UE. The Cell ID scheme for location estimation can be aided by incorporating fBS position information, however, the precision of the UE estimation relies on the transmission radius of fBS. As an example, an fBS can have a transmission radius of about 20 to 30 meters in LTE-A, which can be insufficiently accurate to provide a useful level of UE location estimation.

The benefits of adopting LTE-A HetNet environment can include the incorporation of fBS information as a source for UE location estimation, even though the exact positions of fBS may not be available. In general, the fBSs can be deployed by wireless network operators or consumers to provide improved signal quality for the UEs, such as in obstructed environments. The position information of fBS can be assumed to be roughly obtainable with a corresponding position distribution, e.g., Gaussian distribution can be utilized to represent the position of a fBS with a determined mean and variance. The position of a mBS can be assumed to be precise due to the nature of their deployment as part of the infrastructure of a carrier network.

With the adoption of a LTE-A HetNet (see for example, FIG. 14), a femto-assisted location estimation (FALE) scheme can be deployed to estimate a UE location based on information from mBSs and fBSs. The adoption of the LTE-A system in indoor environments can provide for improvement in determining location estimation accuracy over other wireless network technologies, such as a 2G/3G homogeneous cellular system. This can be because of higher bandwidth processing with OFDMA systems, implying greater distance measurement accuracy by estimating arrival timing with a higher sampling rate, because fBSs provide higher signal quality compared to the traditional cellular system with mBSs only, etc.

In general, most wireless network architectures include highly precise mBSs' positions because the positions are fixed and also because they are based on plans for deploying a wireless network. Where a mBS is mobile, rather than fixed, a GPS located with the mBS can provide highly accurate mBS position information. The signal transmitted between a mBS and a UE is typically significantly attenuated when the UE is located indoors or in other environments that are NLOS. Also generally, fBSs can offer more precise range information compared to a mBSs because they can suffer from less attenuation of transmitted signals where there is less interfering materials between the fBS and the UE as compared to between a mBS and the UE. As an example, a fBS can have less signal attenuation where the path to the UE traverses a cubicle wall and an interior wall as compared to attenuation between a UE and a mBS that can traverse another building, an exterior wall, and several interior walls on the path between the UE and the mBS.

Estimation of the position of fBSs can be imprecise as they can be based on signals from the mBSs. Nevertheless, the positions of a fBS can be determined as part of determining the location of a UE with a FALE scheme. As such, uncertain positions of fBSs can be depicted based on their estimated location distributions. The FALE scheme can be regarded as a generalized spatial cooperation scheme for UE location determination which employs belief information for fBS position to facilitate use of an uncertain fBS position in location determination solutions for the UE.

Temporal cooperation can also be employed in a FALE scheme, e.g., location tracking of a UE in a time domain. Temporal cooperation can be regarded as a posterior result based on both prior knowledge and a likelihood function of an instantaneous observation. The posterior distribution of a UE location can be derived from a recursive Bayesian estimation. To evaluate a UE location in real time, a sequential Monte Carlo (MC) method, e.g., a particle filter, can provide an approach for computing posterior distribution.

In an aspect, a particle filter can be adopted in the FALE scheme to estimate the nonlinear location estimation problem which can be improved by considering temporal cooperation. The FALE scheme can combine a particle filter associated with the position belief information from a fBS with particle expressions to effectively utilize the information from the fBS in determining a location for a UE. Moreover, in order to reduce the computational complexity associated with operating the particle filter, a simplified FALE (FALE-S) scheme can be employed that treats the position of a fBS as a position measurement instead of a positional distribution. Simulation results validate the location determination capabilities of the FALE scheme and the FALE-S scheme, which generally provide better UE location estimation accuracy as compared to more conventional techniques, such as the cell ID method.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate a user equipment (UE) location determination based on macro base station (mBS) and femto base station (fBS) information in accordance with an aspect of the subject matter disclosed herein. System 100 can include femto-assisted location estimation (FALE) component 110. FALE component 110 can receive mBS information 102 and fBS information 104.

In an embodiment, mBS information 102 can include nearly any type of information relating to a mBS, including time or timing information, time or timing signals, synchronization information or signals, position information (e.g., a location of the mBS), range information, signal strength information, identification information, carrier network information, carrier identification information, etc. Similarly, fBS information 104 can include nearly any type of information relating to a fBS, including time or timing information, time or timing signals, synchronization information or signals, position information (e.g., a location of the fBS), network information, range information, signal strength information, identification information, etc. Of note, a network can be a local network, a regional network, a wide area network, or any other type of network. The network can carry data, voice, or combinations thereof, among other types of information. The network can be wireless, or a combination of wired and wireless. In some embodiments a mBS can include a wireless radio component (not illustrated). In some embodiments a fBS can similarly include a wireless radio component (not illustrated). A wireless radio component can be one of a plurality of the same, or similar, wireless radio components included in the network, though not illustrated for clarity and brevity. Of note, a network can comprise any number or other network components to facilitate communicative coupling over the network.

In an aspect, FALE component 110 can determine position information for a fBS based on the mBS information 102. The position information of the fBS can represent a fixed position, e.g., at time t, or can represent position distribution information, e.g., at time t. A fixed position can be determined as a 'best guess' of the position, e.g., a position understood to be subject to positional error but treated as accurate. Position distribution information can be determined as a range of positions for the fBS as a function of the probability of the fBS being in a position of the range of positions, for example, a Gaussian curve of positions for the fBS. In an embodiment, the position information can be determined based on time of arrival (TOA) information for signals transmitted between a mBS and a fBS. As noted hereinabove, other techniques can be employed for determining position information of a fBS without departing from the presently disclosed subject matter.

In a further aspect, fBS position information can be included as part of fBS information 104. As an example, a fBS can determine position information at the fBS and communicate that position information to FALE component 110 as part of the fBS information 104 received by FALE component 110. In other aspects, fBS position information can be determined by components of system 100 not presently illustrated and can then be included as part of fBS information 104. As an example, TDOA information can be employed by other carrier network components (not illustrated) to determine position information for the fBS and this information can be received by FALE component 110. Of note, fBS information 104 can be received from one or more sources, e.g., all fBS information 104 can be sourced by a fBS, all fBS information 104 can be sourced by a mBS, all fBS information 104 can be sourced by a carrier network component (not illustrated), a portion of fBS information 104 can be sourced by a fBS and another portion of fBS information 104 can be sourced by a mBS, etc. Similarly, mBS information 102 can be determined or communicated from one or more components (not illustrated).

FALE component 110 can determine UE location information 106. In an aspect, FALE component 110 can employ a FALE scheme as disclosed in more detail herein below. In another embodiment, FALE component 110 can employ a FALE-S scheme as also disclosed in more detail herein below. In an aspect, FALE component 110 can be embodied in a device (not illustrated), such as a mBS, fBS, pico base station, personal area network (PAN) device, a UE, a server, a discrete FALE device, etc. As such, UE location information can be determined at FALE component 110 of the embodying device, e.g., where FALE component 110 is part of a smartphone, the location of the UE can be determined at the smartphone. In an embodiment, FALE component 110 can also facilitate access to UE location information 106 by other components or devices (not illustrated), such as where UE location information 106 is determined on a device associated with a delivery van of a trucking company, a trucking company server can receive UE location information to facilitate determine the position of the delivery van, such as part of deployed fleet of delivery vehicles. Of note, throughout the present disclosure, determination of UE location information (e.g., 106, 206, etc.) can be disclosed as determined at a UE for convenience and clarity, however the present disclosure is not so limited wherein FALE component (e.g., 110, 210, etc.) can be comprised in nearly any device or system component.

FALE component 110 can receive mBS information 102 comprising information on N mBSs. This mBS information 102 can include the position or location of some or all of the N mBSs. FALE component 110 can also receive fBS information 104 comprising information on H fBSs. This fBS information 104 can include the position or location of some or all of the H fBSs. Further, fBS information 1034 can include information on one or more fBSs whose positions are unknown but are each associated with one or more position distributions. In some embodiments of system 100, a position distribution can be predetermined, e.g., a diameter of about 20 meters, etc. The unknown location of the UE at time t can be represented as $(x^{(t)}=[x^{(t)}y^{(t)}]^T)$ within a HetNet environment from time instant 1 to T. The position of one or more mBS positions can be represented as the set $x_M^{(t)}=[x_{M_1}^{(t)}x_{M_2}^{(t)} \ldots x_{M_i}^{(t)} \ldots x_{M_N}^{(t)}]^T$, where $x_{M_i}^{(t)}=[x_{M_i}^{(t)}y_{M_i}^{(t)}]^T$ denotes two-dimensional position vectors at time instant t. The position of one or more fBS positions can similarly be denoted as $x_F^{(t)}=[x_{F_1}^{(t)}x_{F_2}^{(t)} \ldots x_{F_l}^{(t)} \ldots x_{F_H}^{(t)}]^T$. The parameter $x_{F_l}^{(t)}=[x_{F_l}^{(t)}y_{F_l}^{(t)}]^T$ can represent the mean estimated position of $l^{th}$ fBS belonging to a normal distribution $\mathcal{N}(\hat{x}_{F_l}^{(t)}, \hat{\sigma}_{F_l}^2)$ where $\hat{\sigma}_{F_l}$ is the corresponding standard deviation (STD). In some embodiments, the UE does not need to be synchronized with either a mBS or a fBS. In an aspect, TDOA techniques do not require the timing signals be synchronized because the timing measurements are differential measurements rather than measurements from a reference time. TDOA therefore denotes a time difference between arriving signals from different base stations, e.g., mBSs or FBSs. In general, measurement errors depend on a link quality (e.g., signal-to-noise ratio, etc.) of each path, e.g., the TOA signal path from a mBS or fBS to a UE. However, these timing signals can be treated as interference-free based on an assumption that a carrier network layout seeks to minimize degraded links in their network, e.g., by way of frequency planning with PRS since PRS provides a frequency reuse factor of six, etc. While consideration of measurement errors is contemplated and falls within the scope of the present disclosure, it is not further specifically addressed for brevity and clarity of disclosure.

In an embodiment, FALE component 110 can employ a FALE scheme. In a FALE scheme the fBS that is closest to UE can be selected as a serving BS, in which all the other measurements are subtracted therefrom to obtain TDOA measurements. For notational convince, the index of a serving fBS can be chosen as $x_{F_s}^{(t)}=x_{F_1}^{(t)}$ (s=1). The relationship between distance and propagation time can be approximated as propagation time multiplied by the speed of light is equal to distance. While this does not account for propagation delay from interferers, the approximation is generally considered to introduce only insignificant error into the determined distance. Therefore, the effective TDOA measurement $(r_{i,s}^{(t)})$ between a UE with regard to the $i^{th}$ mBS and serving fBS can be obtained from:

$$r_{i,s}^{(t)}=(\|x_{M_i}^{(t)}-x^{(t)}\|-\|x_{F_s}-x^{(t)}\|)+(n_{M_i}^{(t)}-w_{F_s}^{(t)}), \qquad (1)$$

where $\| \ldots \|$ denotes the Euclidean distance, $n_{M_i}^{(t)}$ denotes measurement noise from the $i^{th}$ mBS to the UE at time instant t, and $w_{F_s}^{(t)}$ represents measurement error from the serving fBS to the UE at time t. As such, $r_s^{(t)}=\{r_{1,s}^{(t)}, r_{2,s}^{(t)}, \ldots r_{N,s}^{(t)}\}$ can represent a collection of TDOA measurements between the UE, with regard to the all the receivable mBSs, and the serving fBS. Further, the TDOA measurement $(d_{l,s}^{(t)})$ between the UE, with regard to the $l^{th}$ fBS, and serving fBS can be represented as:

$$(d_{l,s}^{(t)})=(\|x_{F_l}-x^{(t)}\|-\|x_{F_s}-x^{(t)}\|)+(w_{F_l}^{(t)}-w_{F_s}^{(t)}), \qquad (2)$$

wherein $d_s^{(t)}\{d_{2,s}^{(t)}, d_{3,s}^{(t)}, \ldots, d_{H,s}^{(t)}\}$ can represent the collection of TDOA measurements between the UE, with regard to other receivable fBSs, and the serving fBS. In an embodiment, in consideration of determining indoor locations for UEs in the subject disclosure, a light multipath noise model can be employed for $w_{F_l}^{(t)}$ from the $l^{th}$ fBS because the distance between a fBS and a UE is generally short. In some embodiments, a heavy multipath noise model can be employed with the measurement $n_{M_i}^{(t)}$ from the $i^{th}$ mBS because it can be anticipated that an indoor UE will have more significant noise for the path between the UE and a mBS, e.g., heavy exterior walls, other buildings, other radio transmissions, trees, inclement weather, etc. In an aspect, the occurrence of heavy multipath noise can be assumed to be substantially coming from an exterior wall separation from one or more buildings between the mBS and the UE. Collecting available TDOA measurements from different time instants, the location of a UE, $x^{(t)}=[x^{(t)}y^{(t)}]^T$, can be acquired through use of a particle filter, e.g., a Monte Carlo algorithm, etc., in a LTE-A HetNet.

A model of the correlation for a UE location between different time instants can employ a hidden Markov process of order one as the state model. The location of a stationary UE can be considered as a Markov process from time index t−1 to t as $x^{(t)}=x^{(t-1)}$. In an aspect, the state model for the hidden Markov process can be utilized to smooth out the estimation results of a UE location across different time instants.

Femto-Assisted Location Estimation (FALE) Scheme

A FALE scheme can provide location estimation of a UE by employing a particle filter in conjunction with fBS information, e.g., fBS information 104, 204, etc. A FALE algorithm can utilize a position distribution of one or more fBSs. A simplified FALE (FALE-S) algorithm can utilize a mean estimation of one or more fBSs rather than the position distribution to reduce computational intensity.

An Example FALE Scheme

In an embodiment, based on measurements, including mBS information (e.g., mBS information 102, 202, etc.) and fBS information (e.g., fBS information 104, 204, etc.), and state models, as described elsewhere herein, a recursive Bayesian estimation can be adopted for a FALE scheme. A posterior probability density function (PDF) for a UE position can be derived from Bayes' rule as:

$$P(x^t | r_s^{(1:t)}, d_s^{(1:t)}) = \frac{P(r_s^{(t)}, d_s^{(t)} | x^{(t)}) P(x^{(t)} | r_s^{(1:t-1)}, d_s^{(1:t-1)})}{P(r_s^{(t)}, d_s^{(t)} | r_s^{(1:t-1)}, d_s^{(1:t-1)})}, \quad (3)$$

where the denominator represents a normalizing term as:

$$P(r_s^{(t)}, d_s^{(t)} | r_s^{(1:t-1)}, d_s^{(1:t-1)}) = \int P(r_s^{(t)}, d_s^{(t)} | x^{(t)}) P(x^{(t)} | r_s^{(1:t-1)}, d_s^{(1:t-1)}) dx^t. \quad (4)$$

Further, the numerator in Eq. 3 of the recursive Bayesian estimation can be associated with evaluation of the posterior PDF for UE position based on a likelihood function at a time instant and a prior PDF, for example:

$$P(x^t | r_s^{(1:t)}, d_s^{(1:t)}) \propto P(r_s^{(t)}, d_s^{(t)} | x^{(t)}) P(x^{(t)} | r_s^{(1:t-1)}, d_s^{(1:t-1)}). \quad (5)$$

The likelihood function in Eq. 5 can describes a relation with measurement equations and can be further derived as:

$$P(r_s^{(t)}, d_s^{(t)} | x^{(t)}) = \Pi_i P(r_{i,s}^{(t)} | x^{(t)}) \cdot \Pi_l P(d_{l,s}^{(t)} | x^{(t)}). \quad (6)$$

The prior PDF in Eq. 5, which describes the relation of the state equation can be determined as:

$$P(x^t | r_s^{(1:t-1)}, d_s^{(1:t-1)}) = \int P(x^{(t)} | x^{(t-1)}) P(x^{(t-1)} | r_s^{(1:t-1)}, d_s^{(1:t-1)}) dx^{t-1}. \quad (7)$$

Of note, the closed form expression for a recursive Bayesian position estimation can be unattainable because the location estimation can be a nonlinear problem. As such, a particle filter can be introduced in the FALE scheme to approximate a posterior PDF for UE position by associating weights with a set of particles in the particle filtering technique.

Figure 5:
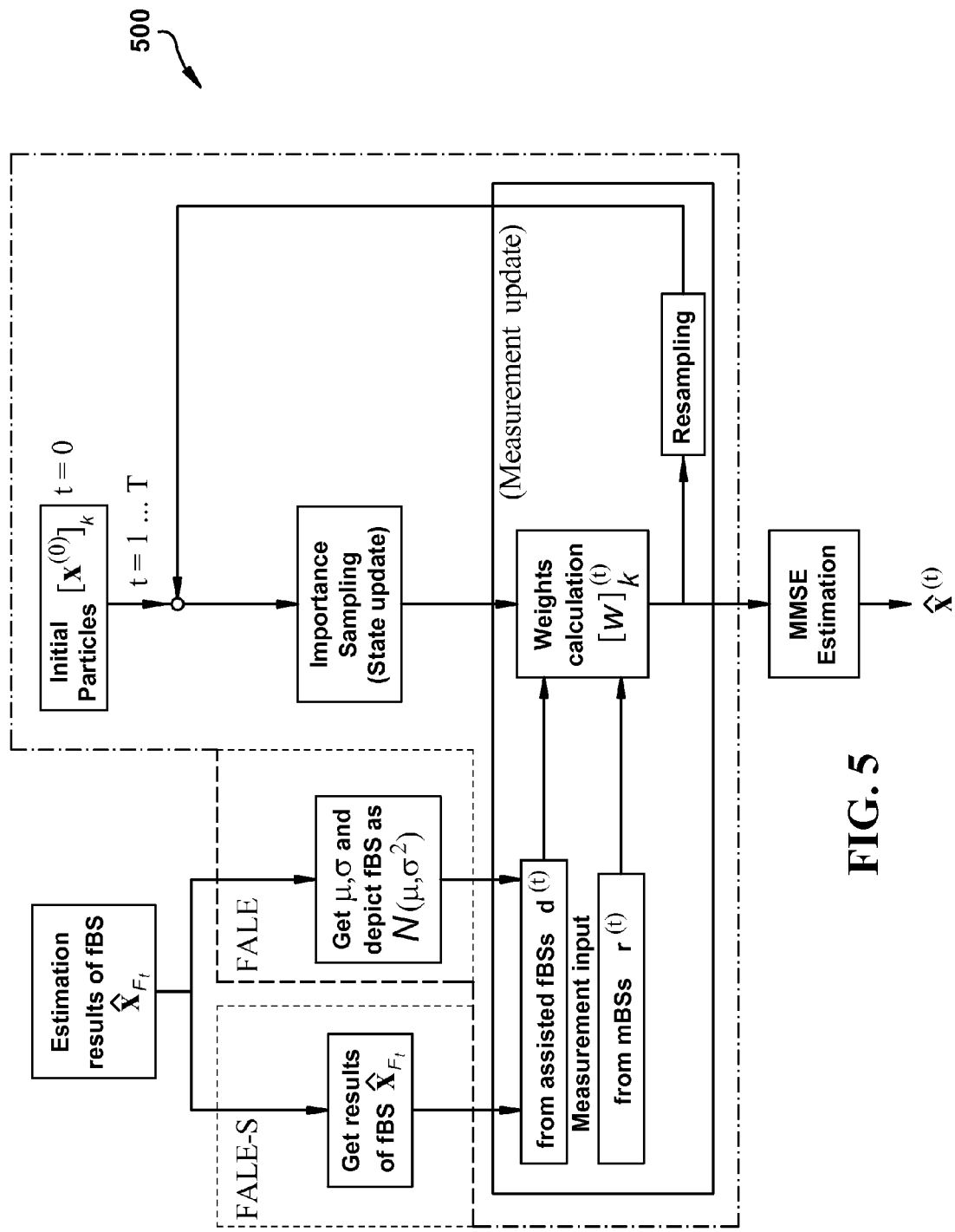
FIG. 5 illustrates a system that can facilitate UE location determination based on femto base station position information in conjunction with particle filtering and resampling in accordance with an aspect of the subject matter disclosed herein.

In an embodiment of an example FALE algorithm, such as FIG. 5, it can be seen that evaluating a weighting of a corresponding particle can be employed in determinations of UE location based on fBS information (e.g., fBS information 104, 204, etc.). The example FALE scheme can include a state update and a measurement update that can be calculated recursively in a FALE algorithm. In some embodiments, information can be received that enables a determination of which building a UE is located in, such that initial particles for a UE location estimation in a particle filter can be spread uniformly in the possible area, e.g., the particles can be spread uniformly in a model of the envelope of a building believed to contain the UE. Of note, in some embodiments, a particle filter can accommodate non-Gaussian distribution of the particles representing an initial UE location based on sampling from a uniform distribution with the modeled envelope of a building. As such, a particle filter can be a robust technique in addressing the estimation of a UE location in an example FALE algorithm in addition to addressing the underlying nonlinear estimation problem.

In an embodiment, a sampling importance resampling (SIR) particle filter can be adopted in a FALE scheme. In other embodiments, other particle filters can be employed, such as, but not limited to, auxiliary sampling importance resampling (ASIR) filter, regularized particle filter (RPF), and etc. Though these are not discussed further herein for brevity and clarity, they are considered within the scope of the present disclosure. In a SIR particle filter, importance sampling can be employed to adjust a particle based on an importance distribution, such as, prior probability, and a resampling can adapt the particles to settle degeneracy which can be caused by particles with insignificant weight after an iteration of the particle filter with SIR. Wherein $[w^{(t)}]_k$ can be the weight associated with the $k^{th}$ particle $[x^{(t)}]_k$, the random measure $\{[x^{(t)}]_k, [w^{(t)}]_k\}$ can characterize a posterior PDF for UE location as:

$$P(x^t | r_s^{(1:t)}, d_s^{(1:t)}) \approx \Sigma_{k=1}^K [w^{(t)}]_k \delta(x^{(t)} - [x^{(t)}]_k), \quad (8)$$

where K is the number of particles and $\delta(\cdot)$ represents a continuous Dirac delta-function. In a state update iteration, an importance sampling method, e.g., SIR, can reflect a transitional prior distribution, e.g., $[x^{(t)}]_k \approx P(x^{(t)} | [x^{(t-1)}]_k)$ which can be used to predict particles positions correlating to location information, e.g., UE locations. The associated weight can be updated from weights at a previous time instant and a likelihood function at a current time instant as:

$$[w^{(t)}]_k \propto [w^{(t-1)}]_k \cdot P(r_s^{(t)}, d_s^{(t)} | x^{(t)}). \quad (9)$$

In an aspect, importance sampling can determine samples or particles based on an importance distribution, for example, prior probability. In another aspect, samples from an importance sampling distribution can represent a user equipment position by employing particles from a posterior distribution that are determined to be near the true historical position of the user equipment. As such, a set of particles can be resampled from the approximate posterior distribution to discard less important particles and increase more important particles to improve the estimation of a user equipment position. Resampling therefore can tune a set of particles by removing a low importance particle or emphasizing a high importance particle. Thus, SIR can avoid degeneracy caused by particles having insignificant weights while maintaining the distribution of the original set of particles.

In an embodiment, a position of a fBS can be estimated through a particle filter with A iterations before a UE location estimation is determined and the estimated position results, $\hat{x}_{F_l}$, can be regarded as assisted fBS measurement information, such that the estimated fBS position can be employed in a FALE scheme for UE location information determination. A statistical analysis evidences assisted fBS measurement information employed as an input to a UE location information determination can depict a normal distribution, e.g., with a mean $\hat{x}_{F_l}$ and a STD $\hat{\sigma}_{F_l}$. Subsequently, at a measurement update, a measurement from a mBS and an assisted fBS can be employed, such that the weights can be evaluated to a corresponding particle(s) as:

$$[\tilde{w}^{(t)}]_k \propto \Pi_i P(r_{i,s}^{(t)} | [x^{(t)}]_k) \cdot \Pi_l P(d_{l,s}^{(t)} | [x^{(t)}]_k) \cdot [w^{(t-1)}]_k, \quad (10)$$

where the weight(s) can be normalized by:

$$[w^{(t)}]_k = \frac{[\tilde{w}^{(t)}]_k}{\sum_{k=1}^{K} [\tilde{w}^{(t)}]_k}. \quad (11)$$

Of note, a particle filter can approximate the posterior PDF such that $\Sigma_{k=1}^{K}[w^{(t)}]_k=1$. Whereas the position of a fBS can be denoted as a position distribution from an estimated position, a likelihood function for a mBS measurement can be expressed as:

$$P(r_{i,s}^{(t)}|[x^{(t)}]_k) = \Sigma_{p=1}^{K} P(r_{i,s}^{(t)}|[x^{(t)}]_k,[\hat{x}_{F_s}]_p). \quad (12)$$

Further, a fBS measurement can be employed as:

$$P(d_{i,s}^{(t)}|[x^{(t)}]_k) = \Sigma_{p=1}^{K} P(d_{i,s}^{(t)}|[x^{(t)}]_k,[\hat{x}_{F_s}]_p). \quad (13)$$

The resampling in a SIR enabled particle filter can include dropping a particle with negligible weight from a particle set and to increase the number of particles associated with a with stronger weight, e.g., by copying stronger weight particles one or more times and then modulate the set of particles into equal weight. In an aspect, resampling can drop the particles with negligible weight from the particle set and increase those particles with stronger weight to settle degeneracy caused by particles with insignificant weight. Moreover, the weights can be adjusted to 1/K, such as in a conventional resampling method for a SIR enabled particle filter. As such, the associated weight for the $k^{th}$ particle can be the same as another particle after resampling in a SIR enabled particle filter. Further, an associated weight from a previous time instant $[w^{(t-1)}]_k$ can be neglected, such that the minimum mean square error (MMEE) location estimation can be evaluated through a weighted average as:

$$\hat{x}^{(t)} = E[x^{(t)}|r_s^{(1:t)}, d_s^{(1:t)}] = \int P(x^t|r_s^{(1:t)}, d_s^{(1:t)}) x^{(t)} dx^t \approx \Sigma_{k=1}^{K} [w^{(t)}]_k [x^{(t)}]_k. \quad (14)$$

An Example FALE-S Scheme

In an aspect, the example FALE scheme can be computationally intensive, with complexity increasing when the number of particles becomes large. As such, the demands on processors can introduce a burden that can affect other processes being executed. A simplified FALE (FALE-S) scheme can serve to reduce computational intensity and, as such, can alleviate this problem. Where processors continue to improve, a FALE scheme can be employed more readily with less impact on other processes being executed. A FALE-S scheme can employ an algorithm to reduce the complexity occurring form the adoption of an unknown fBS position, e.g., $[\hat{x}_{F_j}]_p$ in Eq. (12), $[\hat{x}_{F_j}]_p$ and $[\hat{x}_{F_j}]_p$ in Eq. (13), etc. In the example FALE scheme (see also, for example, FIG. 6), a measurement input from an assisted fBS can adopt fBS position distribution information, which can comprise a mean or variance of fBS position. In an embodiment, the fBS position distribution information can reflect parameters collected after estimating a fBS position over one or more iterations, such as 1000 iterations, in order to acquire statistically meaningful position distribution information results. In a FALE-S scheme, instead of using fBS position distribution information, the FALE-S scheme can utilize each fBS position estimate as a true position of the fBS (e.g., $\hat{x}_{F_j}$). In an embodiment, a FALE-S algorithm can adopt a fixed estimated position of a fBS, rather than a fBS position distribution, in order to reduce the computational burden resulting from computing a position distribution in each iteration of a particle filter associated with assisted fBS. This simplification of the example FALE scheme becomes more notable where there are large numbers of particles in the calculations. The example FALE-S scheme can otherwise adopt the same benefits as the FALE scheme and this the FALE-S algorithm can follow the FALE algorithm, however adopting weighting and resampling based on a fixed fBS position rather than a fBS position distribution. As such, the number of fBS particles employed in the example FALE-S scheme can be reduced from K to 1, in contrast to the example FALE algorithm. As a result, the computational complexity can be reduced from $O(K^2)$ in the example FALE scheme to $O(K)$ in example FALE-S scheme. It is intuitive that the example FALE scheme should provide better UE location estimation performance based on the consideration of long-term statistics for fBS position. However, the performance difference between the example FALE scheme and the example FALE-S scheme are close enough that in some instances, the tradeoff of less accuracy for lower processor demand can be appropriate.

Figure 2:
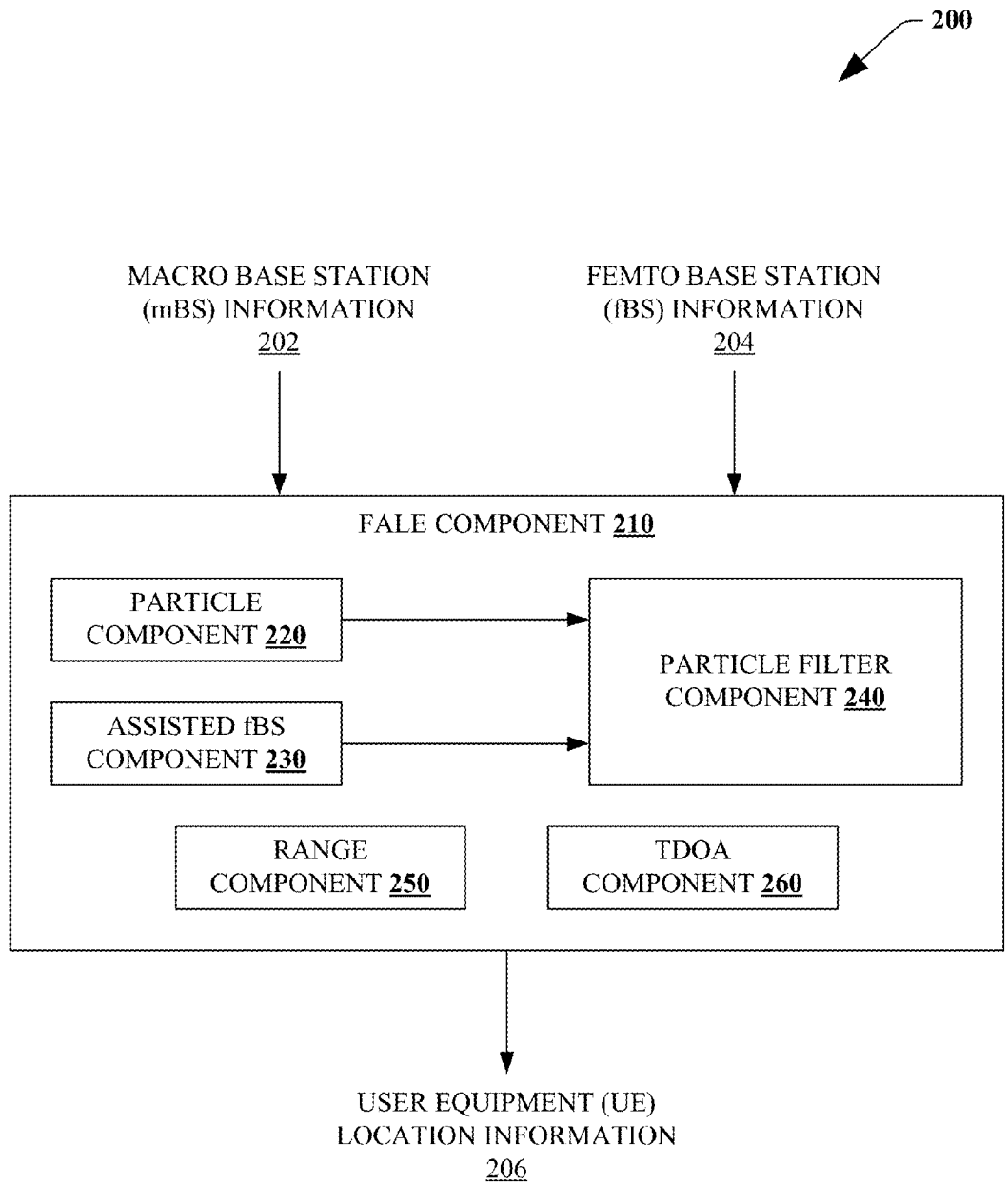
FIG. 2 illustrates a system that can facilitate UE location determination by employing a particle filter in accordance with an aspect of the subject matter disclosed herein.

FIG. 2 depicts a system 200 that can facilitate UE location determination by employing a particle filter in accordance with an aspect of the disclosed subject matter disclosed herein. System 200 can include FALE component 210. FALE component 210 can receive mBS information 202 and fBS information 204. In an embodiment, mBS information 202 can include nearly any type of information relating to a mBS, including time or timing information, time or timing signals, synchronization information or signals, position information, etc. Similarly, fBS information 204 can include nearly any type of information relating to a fBS.

In an aspect, FALE component 210 can determine position information for a fBS based on the mBS information 202. The position information of the fBS can represent a fixed position, such as at time t, or can represent position distribution information, such as at time t. In a further aspect, fBS position information can be included as part of fBS information 204. In other aspects, fBS position information can be determined by assisted fBS component 230 (see herein below). Of note, fBS information 204 can be received from one or more sources. Similarly, mBS information 202 can be determined or communicated from one or more components (not illustrated). FALE component 210 can determine UE location information 206. In an aspect, FALE component 210 can employ a FALE scheme as disclosed in more detail herein. In another embodiment, FALE component 210 can employ a FALE-S scheme as also disclosed in more detail herein. In an aspect, FALE component 210 can be embodied in a device. As such, UE location information can be determined at FALE component 210 of the embodying device. In an embodiment, FALE component 210 can also facilitate access to UE location information 206 by other components or devices (not illustrated).

FALE component 210 can comprise particle component 220. Particle component 220 can facilitate access to a particle set. In an embodiment, the particle set can be an initial particle set. In an aspect, the particle set can represent particles distributed over a determined area. As an example, particle component 220 can facilitate access to a set of particles representing possible UE locations within the determined envelope of a building. As such, where a UE can be identified as likely being in a particular building, the particle set can be adapted to the envelope of that building and can therefore eliminate the computations for particles not in the building envelope.

In an embodiment, FALE component 210 can comprise assisted fBS component 230. Assisted fBS component 230 can enable determination of assisted fBS information. This can be particularly beneficial when assisted fBS information is not otherwise available, such as not being provided as part of fBS information 204. As disclosed elsewhere herein, a position of a fBS can be estimated through a particle filter with A iterations before a UE location estimation is determined and the estimated fBS position results $\hat{x}_{F_i}$ can be identified as assisted fBS information, such that the estimated fBS position can be employed in a FALE scheme for UE location information determination. A statistical analysis illustrates that assisted fBS information employed as an input to a UE location information determination can depict a normal distribution, e.g., with a mean $\hat{x}_{F_i}$ and a STD $\hat{\sigma}_{F_i}$. In an embodiment, assisted fBS component 230 can receive fBS information 204 and can determine a fBS position distribution based on fBS information 204.

FALE component 210 can further comprise particle filter component 240. Particle filter component 240 can receive information form particle component 220, assisted fBS component 230, etc. Particle filter component 240 can weight particles based on the information from the particle component 220 and the assisted fBS component 230. In an embodiment, the resulting weighted particles can be filtered and resampled to normalize the particles. Resampling of the particle set can then be applied to remove low weight particles and pluralize high weight particles, thus filtering the particles to concentrate particles at locations corresponding to higher probabilities of a UE location. In an embodiment, the weighting, resampling and filtering can be performed iteratively.

In some embodiments, FALE component 210 can include range component 250. Range component 250 can determine a distance based on mBS information or fBS information. As an example, range component 250 can multiply a time value received in fBS information by the speed of light to approximate the range of the corresponding fBS. In an aspect, correction techniques can be applied to range calculations to account to interference otherwise ignored in a simple speed of light multiplied by time calculation. Of note, although detailed discussion of such corrective techniques is beyond the scope of present discussion for the sake of clarity and brevity, all such techniques are considered to be within the scope of the instant disclosure.

FALE component 210 can further comprise TDOA component 260. TDOA component 260 can determine TDOA information based on mBS information and fBS information. As disclosed elsewhere herein, TDOA information can be readily employed without relying on synchronous signaling. In an embodiment, TDOA component 260 can receive range information, e.g., form range component 250, to facilitate identifying a closest fBS. As such, TDOA information can be determined by TDOA component 260 relative to the closest fBS.

Figure 3:
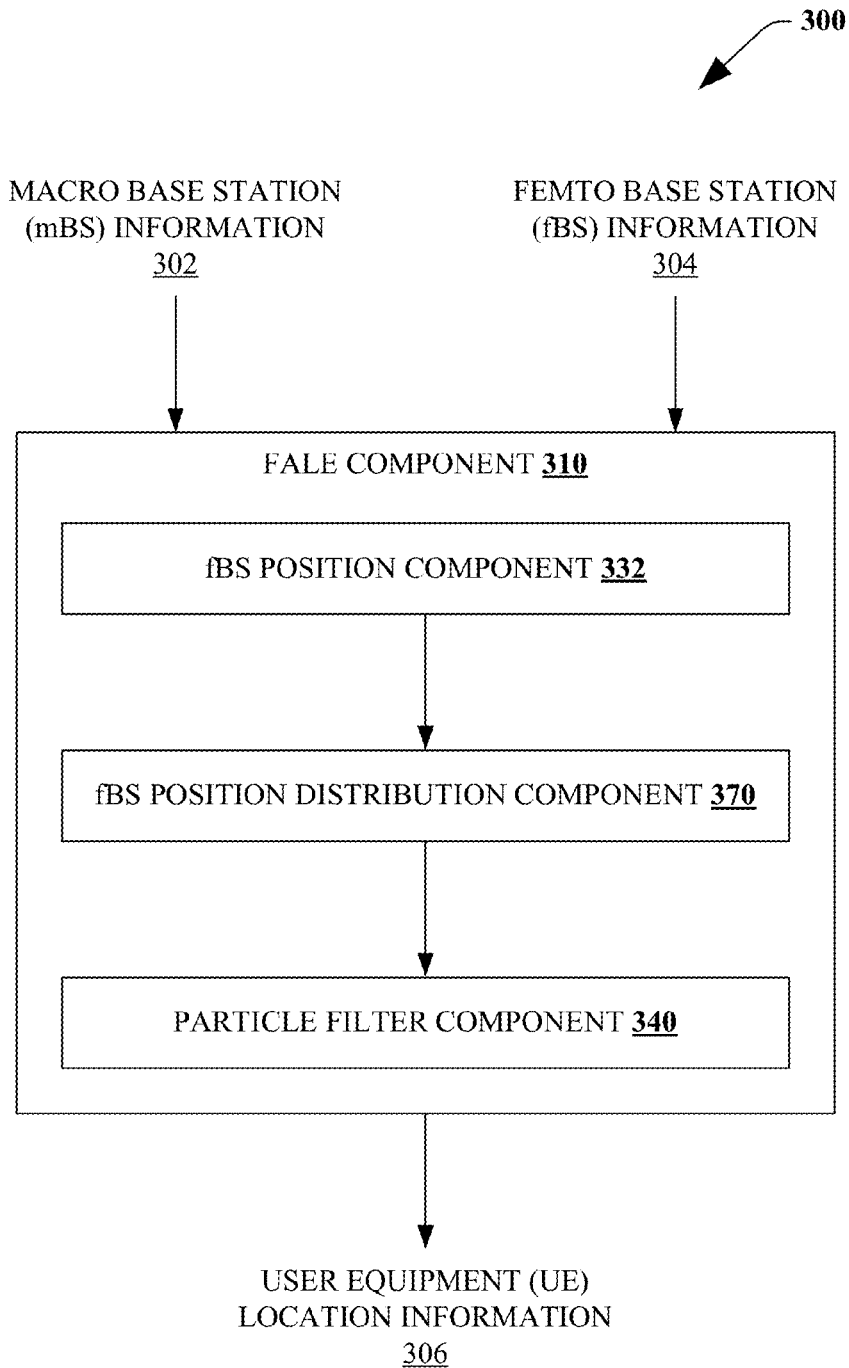
FIG. 3 is a diagram of a system that can facilitate UE location determination based on assisted femto base station information including femto base station position distribution in accordance with an aspect of the subject matter disclosed herein.

Turning now to FIG. 3, presented is a diagram of a system 300 that can facilitate UE location determination based on assisted femto base station information including femto base station position distribution in accordance with an aspect of the subject matter disclosed herein. System 300 can include FALE component 310. FALE component 310 can receive mBS information 302 and fBS information 304. In an embodiment, mBS information 302 can include nearly any type of information relating to a mBS, including time or timing information, time or timing signals, position information, etc. Similarly, fBS information 304 can include nearly any type of information relating to a fBS. In an aspect, FALE component 310 can employ a FALE scheme as disclosed in more detail herein. In an aspect, FALE component 310 can be embodied in a device. As such, UE location information can be determined at FALE component 310 of the embodying device. In an embodiment, FALE component 310 can also facilitate access to UE location information 306 by other components or devices (not illustrated).

FALE component 310 can include fBS position component 332. fBS position component 332 can determine position information for a fBS based on the mBS information 302. The position information of the fBS can represent a fixed position or can be employed to determine fBS position distribution information. In some embodiments, fBS position information can be included as part of fBS information 304 and can be passed to fBS position distribution component 370 directly. In other embodiments, fBS position information can be determined by fBS position component 332 and then passed to fBS position distribution component 370. As such, fBS position component 332 can facilitate determination of assisted fBS information. This can be particularly beneficial when assisted fBS information is not otherwise available, such as not being provided as part of fBS information 304.

As disclosed elsewhere herein, a position of a fBS can be estimated through a first particle filter operation with A iterations before a second particle filter operation is employed to determine UE location information. As such, fBS position information can be determined, e.g., at 332, and the fBS position information results can be employed to determine fBS position distribution information, e.g., $\hat{x}_{F_i}$, that can be designated assisted fBS information, such that the estimated fBS position can be employed in a FALE scheme for UE location information determination. fBS information can be employed as an input to a UE location information determination and, in some embodiments, can represent a normal distribution, e.g., with a mean $\hat{x}_{F_i}$ and a STD $\hat{\sigma}_{F_i}$. In an embodiment, fBS position component 332 can receive fBS information 304 and can determine fBS position information based on fBS information 304. The determined fBS position information can be received by fBS position distribution component 370 to determine fBS position distribution information.

FALE component 310 can further comprise particle filter component 340. Particle filter component 340 can receive information from fBS position distribution component 370. Particle filter component 340 can weight particles based on the information from fBS position distribution component 370. In an embodiment, the resulting weighted particles can be filtered and resampled to normalize the particles. Resampling of the particle set can then be applied to remove low weight particles and pluralize high weight particles. The remaining particles are therefore representative of higher location probabilities for a UE. In an embodiment, the weighting, resampling and filtering can be performed iteratively.

Figure 4:
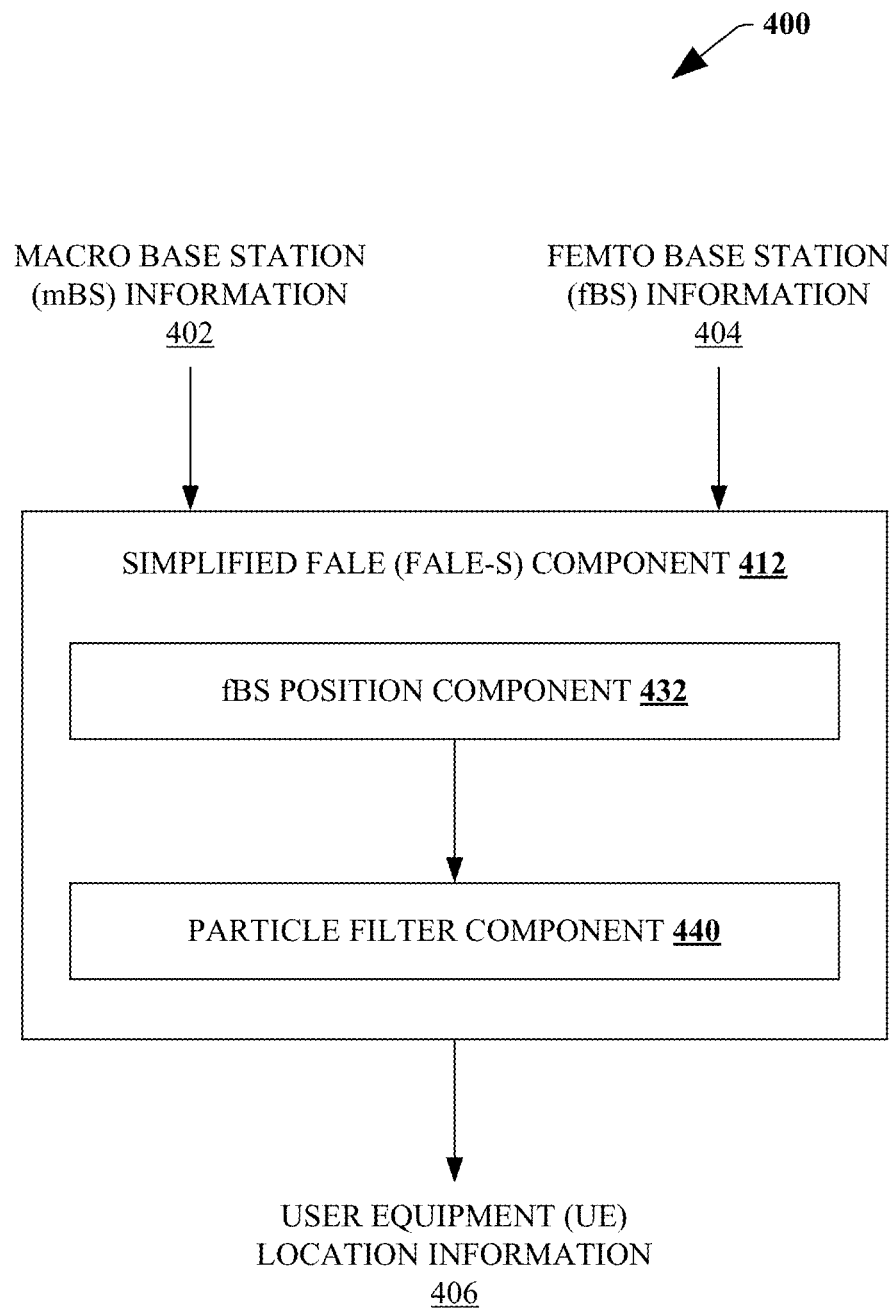
FIG. 4 illustrates a system that can facilitate UE location determination based on assisted femto base station information in accordance with an aspect of the subject matter disclosed herein.

FIG. 4 depicts a system 400 that can facilitate UE location determination based on assisted femto base station information in accordance with an aspect of the disclosed subject matter disclosed herein. System 400 can include simplified FALE (FALE-S) component 412. FALE-S component 412 can receive mBS information 402 and fBS information 404. In an embodiment, mBS information 402 can include nearly any type of information relating to a mBS, including time or timing information, time or timing signals, position information, etc. Similarly, fBS information 404 can include nearly any type of information relating to a fBS. In an aspect, FALE-S component 412 can employ a FALE-S scheme as disclosed in more detail elsewhere herein. In an aspect, FALE-S component 412 can be embodied in a device. As such, UE location information can be determined at FALE-S component 412 of the embodying device. In an embodiment, FALE-S component 412 can also facilitate access to UE location information 406 by other components or devices (not illustrated).

FALE-S component 412 can include fBS position component 432. fBS position component 432 can determine position information for a fBS based on the mBS information 402. The position information of the fBS can represent a fixed position. In some embodiments, fBS position information can be included as part of fBS information 404 and can be passed to particle filter component 440 directly. In other embodiments, fBS position information can be determined by fBS position component 432 and then passed to particle filter component 440. As such, fBS position component 432 can facilitate determination of UE location information.

As disclosed elsewhere herein, a position of a fBS can be estimated through a first particle filter operation with A iterations in conjunction with a second distinct particle filter operation employed to determine UE location information. As such, fBS position information can be determined, e.g., at 432, and employed as a fixed position when particle filtering for UE location information determination employing the FALE-S scheme disclosed elsewhere herein. fBS position information, rather than assisted fBS position distribution information, can be employed as an input to a UE location information determination where a reduction in computational complexity is sought at the expense of the higher accuracy of the FALE scheme disclosed elsewhere herein.

In an embodiment, fBS position component 432 can receive fBS information 404 and can determine fBS position information based on fBS information 404 and passed to particle filter component 440 to facilitate UE location information determination. Particle filter component 440 can weight particles based on the information from fBS position component 432. In an embodiment, the resulting weighted particles can be filtered and resampled to normalize the particle weights. Resampling of a set of particles related to the importance distribution can then be applied to remove low weight particles and pluralize high weight particles. The remaining particles can therefore be representative of higher location probabilities for a UE. In an embodiment, the weighting, resampling and filtering can be performed iteratively. In an aspect, FALE-S can be expected to be computationally more simple than the FALE techniques discloses herein, because a fBS position is accepted as fixed position rather than as a probabilistic position distribution of the fBS position. This simplification of fBS position can reduce computational demand on a processor which can reduce battery/power consumption, increase computation speeds, or make the scheme available to less expensive processors and/or legacy devices. It can be further expected that FALE-S scheme can be less accurate than the higher computationally complex FALE scheme.

FIG. 5 depicts a system 500 that can facilitate UE location determination based on femto base station position information in conjunction with particle filtering and resampling in accordance with an aspect of the disclosed subject matter disclosed herein. As illustrated, system 500 can employ either the FALE scheme (dashed perimeter) or the FALE-S scheme (dotted perimeter). System 500 can include a set of particles (e.g., initial particles) representing a distribution of particles in a defined area, e.g., the envelope of a building, etc. The set of particles can be importance sampled (e.g., at importance sampling) based on a distribution, e.g., an importance distribution, posterior distribution, etc.

The importance sampled particles can then undergo a measurement update (e.g., shaded region of system 500) where timing measurements, e.g., TDOA information, can be received for mBS and fBS associated with the UE. The fBS information can be based on position information determined for the corresponding fBSs. In an embodiment, fBS information can be FALE scheme fBS information (e.g., in the dashed perimeter) and include fBS position distribution information as disclosed elsewhere herein. Alternatively, in another embodiment, fBS information can be FALE-S scheme fBS information (e.g., in the dotted perimeter) and include fBS position information also as disclosed elsewhere herein. Both FALE scheme and FALE-S scheme information can be based on an estimation of fBS position, which as disclosed elsewhere, can be based on particle filtering of mBS information, e.g., 102, 202, etc., or fBS information, e.g., 104, 204, etc.

After weighting the particles from importance sampling, the particles can be resampled to normalize their weights. In an aspect, resampling can selectively remove low probability particles and generate child particles for higher probability particles to reduce or avoid degeneracy caused by particles with insignificant weight without loss of the distribution of the set of particles. These resampled particles can then be returned for additional importance sampling for a predetermined number of iterations or until a condition relating to a rule is determined to be satisfied. The resulting particle set can be received for MMSE estimation before a UE position is determined, e.g., $\hat{x}^{(t)}$.

Figure 6:
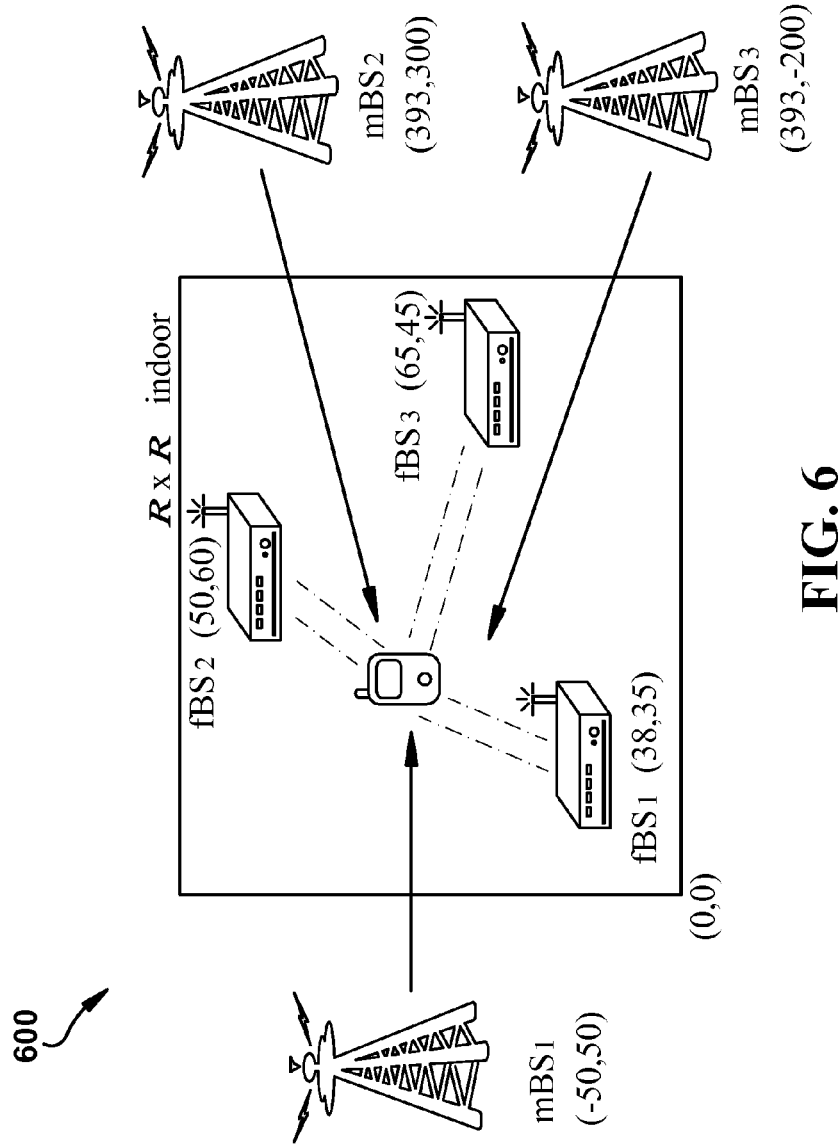
FIG. 6 is a diagram of a system that can facilitate UE location determination based macro base station and femto base station information in accordance with an aspect of the subject matter disclosed herein.

FIG. 6 depicts a diagram of a system 600 that can facilitate UE location determination based macro base station and femto base station information in accordance with an aspect of the disclosed subject matter disclosed herein. System 600 can include one or more mBSs, e.g., $mBS_1$, $mBS_2$, $mBS_3$, etc. System 600 can further include one or more fBSs, e.g., $fBS_1$, $fBS_2$, $fBS_3$, etc. The mBS and fBS can provide information, e.g., mBS information (102, 202, etc.) or fBS information (104, 204, etc.) to a UE. The UE can include a FALE component (not illustrated) or FALE-S component (not illustrated). As such, the UE can determine UE location information based on the mBS information and fBS information.

In an embodiment, mBS information can be employed to determine fBS position information as disclosed elsewhere herein. As such, fBS information can be fixed position information for a time t that can be employed in a FALE-S scheme to determine UE location information, or can be probabilistic position distribution information for the time t that can be employed in a FALE scheme to determine UE location information. In an aspect, the UE can be located indoors (e.g., in an R×R space) that can cause mBS information to be more heavily interfered with, doe to traversing exterior walls (e.g., outlined square), than the illustrated fBSs that do not traverse the exterior walls. The UE can then determine location information based on particle filtering as disclosed for the corresponding FALE scheme or FALE-S scheme disclosed herein. As previously disclosed, the FALE scheme can be more computationally intensive but yield more accurate results than the less computationally intensive FALE-S scheme.

Figure 7:
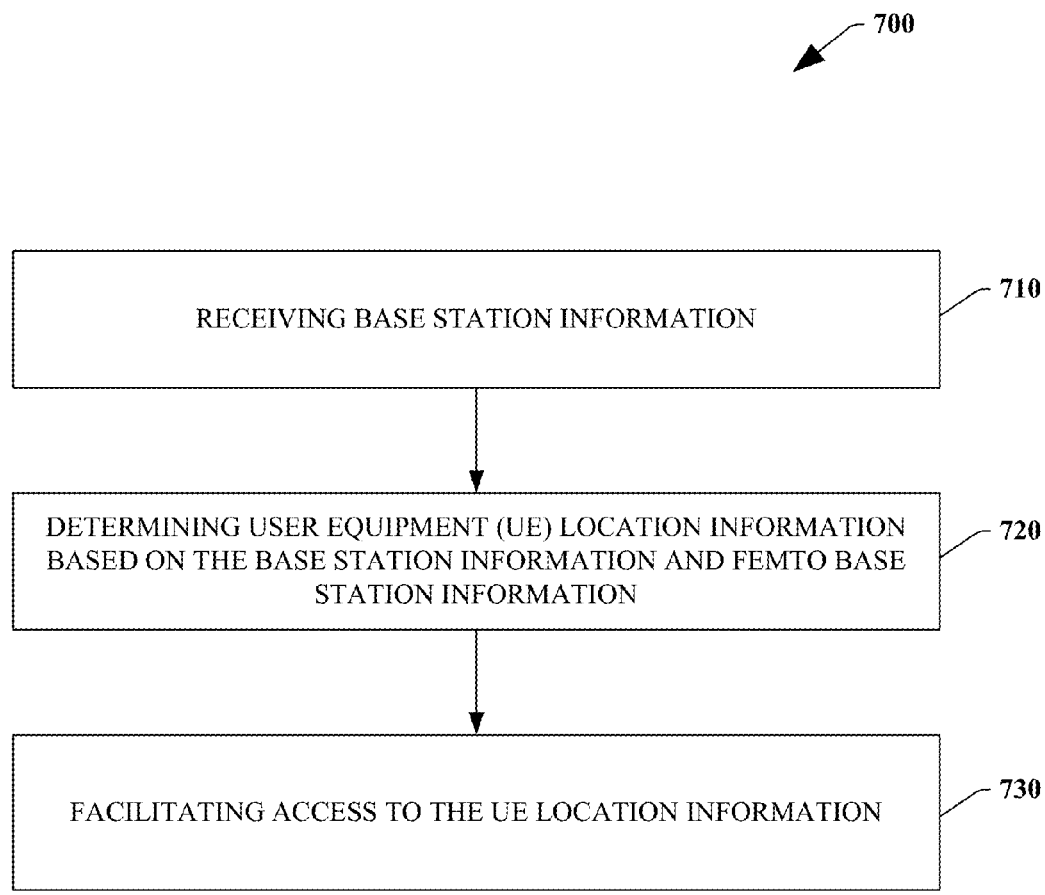
FIG. 7 illustrates a method that facilitates UE location determination based on base station information in accordance with an aspect of the disclosed subject matter.
Figure 8:
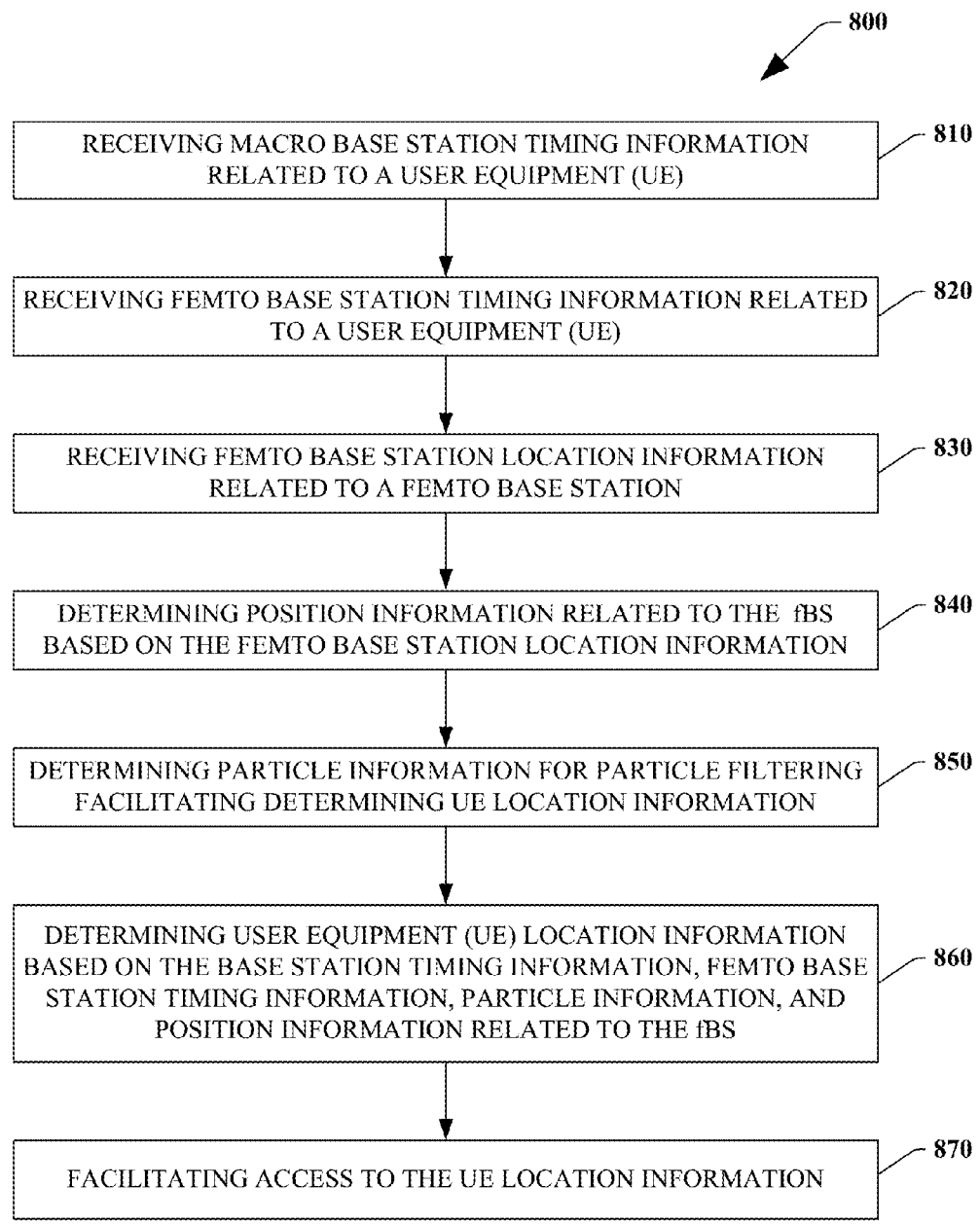
FIG. 8 illustrates a method that facilitates UE location determination based femto base station information and particle filtering in accordance with an aspect of the disclosed subject matter.
Figure 9:
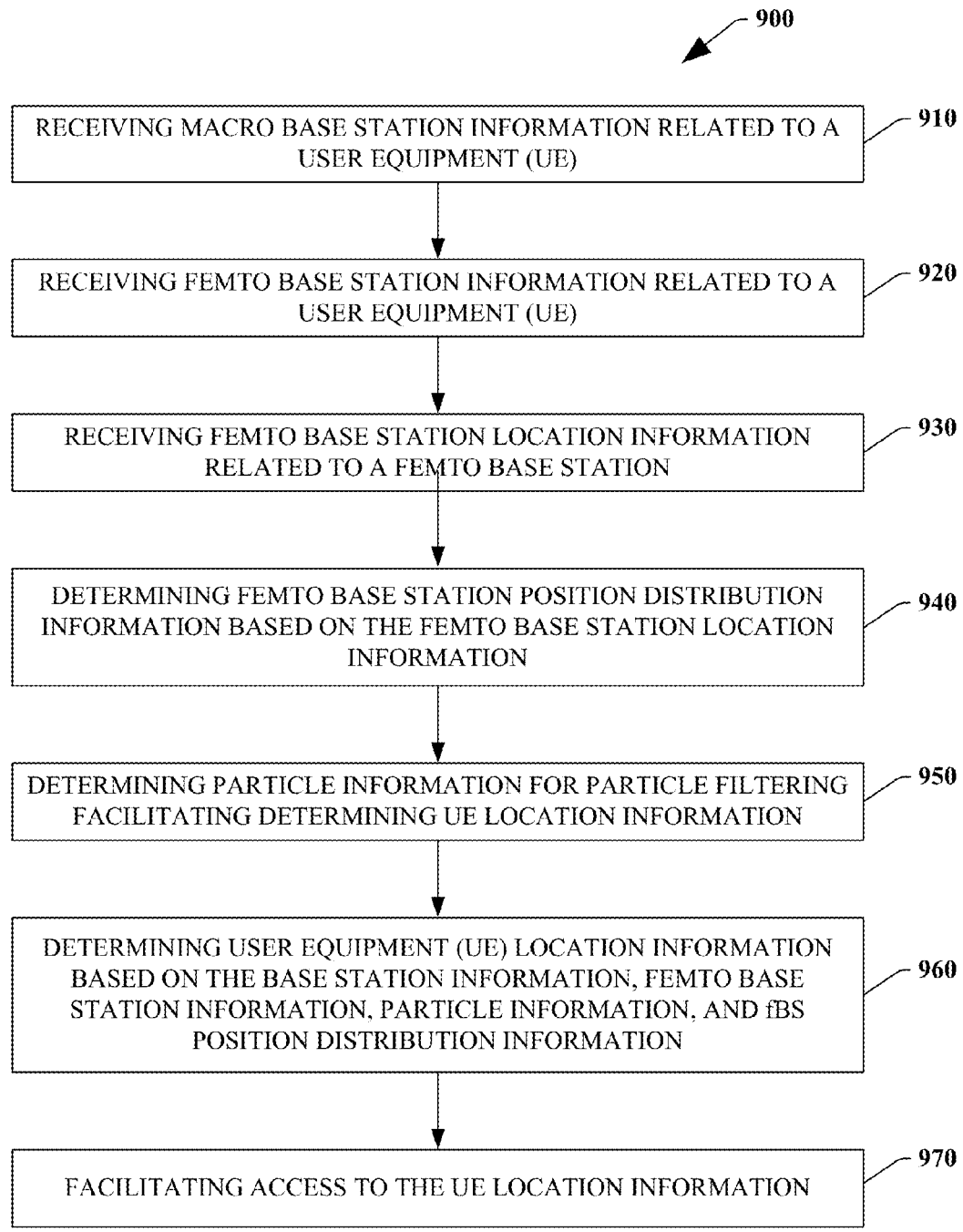
FIG. 9 illustrates a method that facilitates UE location determination based on femto base station position distribution information in accordance with an aspect of the disclosed subject matter.

In view of the example system(s) described above, example method(s) that can be implemented in accordance with the disclosed subject matter can be better appreciated with reference to flowcharts in FIG. 7-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates a method 700 that facilitates UE location determination based on base station information in accordance with an aspect of the disclosed subject matter. At 710 base station information can be received. Base station information can comprise mBS information or fBS information. In an embodiment, mBS information can include nearly any type of information relating to a mBS, including time or timing information, time or timing signals, synchronization information or signals, position information (e.g., a location of the mBS), range information, signal strength information, identification information, carrier network information, carrier identification information, etc. Similarly, fBS information can include nearly any type of information relating to a fBS, including time or timing information, time or timing signals, synchronization information or signals, position information (e.g., a location of the fBS), network information, range information, signal strength information, identification information, etc.

At 720, UE location information can be determined. UE location information can be determined based on base station information received at 710. In an embodiment, position information for a fBS can be determined based on the mBS information comprised in based station information from 710. In another embodiment, fBS information can be received directly as part of base station information from 710. The position information of the fBS can represent a fixed position, e.g., at time t, or can represent position distribution information, e.g., at time t. A fixed position can be understood to be subject to positional error but treated as accurate. Position distribution information can also be determined as a range of positions for the fBS as a function of probability, for example, a Gaussian curve of positions for the fBS. In an embodiment, the position information can be determined based on time difference of arrival (TDOA) information for signals transmitted between a mBS and a fBS. As noted hereinabove, other techniques can be employed for determining position information of a fBS without departing from the presently disclosed subject matter.

In an aspect, method 700 can employ fBS position information to determine UE location information at 720. At 720, a FALE scheme or a FALE-S scheme, as disclosed herein above, can be employed to determine a UE location based on fBS position information. In an embodiment, a FALE scheme can be employed, such that fBS position distribution information can be employed to determine a UE location. The fBS position distribution information can be employed to weight particles in a particle filter. The weighted particles can be resampled to normalize the particle weights. The particles can then be importance selected, wherein less important particles are removed and more important particles are replicated. The particle filter process can be iterative, such that each pass through the particle filter reweights the remaining particles, resamples them, and then applies the importance sampling. This can result in a statistical reduction of particles at positions correlating to an area where a UE is unlikely to be located and an increase in particles at positions correlating to areas where a UE has a higher likelihood of being located. Furthermore, in some embodiments, an initial particle set can represent possible locations of a UE in a manner such that the initial particle set begins with particles correlating to low probability areas of UE location already excluded. As an example, an initial particle set can be distributed across a representation of a building floor plan so as to exclude particles that would otherwise be outside of the building.

In another embodiment, a FALE-S scheme can be employed to determine a UE location. The fBS position information can comprise fixed position information at rather than a position distribution. The fBS position information can be employed to weight particles in a particle filter. By employing a fixed position rather than a position distribution, the computational burden can be reduced. The weighted particles can be resampled to normalize particle weights. The particles can then be importance selected, wherein less important particles are removed and more important particles are replicated. The particle filter process can be processed iteratively, such that each pass through the particle filter weights the remaining particles, resamples them, and then applies importance sampling. This can result in a statistical reduction of particles at positions correlating to an area where a UE is unlikely to be located and an increase in particles at positions correlating to areas where a UE has a higher likelihood of being located. Furthermore, in some embodiments, an initial particle set can represent possible locations of a UE in a manner such that the initial particle set begins with particles correlating to low probability areas of UE location already excluded. As an example, an initial particle set can be distributed across a representation of a building floor plan so as to exclude particles that would otherwise be outside of the building. In an aspect, the FALE-S scheme can have lower computational intensity but can also be associated with less accurate UE location determinations because the fBS positions include error that is not compensated for as it is in the FALE scheme.

At 730, an access to the UE location information determined at 720 can be facilitated. At this point method 700 can end. In an embodiment, access to UE location information can be facilitated for other components or devices that that employing method 700 (not illustrated). As an example, where UE location information is determined by method 700 on an employee smartphone, an employer server can receive UE location information to facilitate determination of the position of the employee on the corporate campus.

FIG. 8 illustrates a method 800 that facilitates UE location determination based femto base station information and particle filtering in accordance with an aspect of the disclosed subject matter. At 810 mBS information can be received. In an embodiment, mBS information can include nearly any type of information relating to a mBS, including time or timing information, time or timing signals, synchronization information or signals, position information (e.g., a location of the mBS), range information, signal strength information, identification information, carrier network information, carrier identification information, etc.

At 820, fBS information can be received. fBS information can include nearly any type of information relating to a fBS, including time or timing information, time or timing signals, synchronization information or signals, position information (e.g., a location of the fBS), network information, range information, signal strength information, identification information, etc.

At 830, fBS location information can be received. In an embodiment, fBS location information can be part of the fBS information received at 820. In another embodiment, fBS location information can be separately received. In an aspect, fBS location information can be information relating to the location of a fBS, such as location information determined by GPS, TDOA, TOA, AOA, etc., for the fBS. The fBS location information can be associated with a degree of error. In an aspect, fBS location information can be determined based on the mBS information received at 810.

At 840, fBS position information can be determined. In an embodiment, the fBS position information can be determined based on the fBS location information from 830. In an aspect, fBS position information can represent a fixed position for a time t. A fixed position can be understood to be subject to positional error but treated as accurate. As an example, where fBS location information is determined based on GPS measurements, an error of about 3 meters can be assumed. As such, in this example, fBS position information can be treated as a fixed position such that the position information can simply indicate the fBS at zero meters and the +/−3 meter error is simply ignored.

At 850, particle information for possible UE positions can be determined. Particle information can be a set of particles distributed in a model. In an embodiment, particle information can be an initial set of particles, e.g., an entry point for particle filtering techniques. Furthermore, in an embodiment, the particle information can be adapted to represent determined constraints. As an example, where an employee is restricted to only part of a building, the particle information can embody a particle distribution only in the areas of the building that the employee would have access to, thereby removing particles in areas that the employee would not be in.

At 860, UE location information can be determined. UE location information can be determined based on mBS information received at 810, fBS information received at 820, fBS position information from 840, and particle information from 850. In an aspect, method 800 can employ fBS position information to determine UE location information at 860 by employing a FALE-S scheme, as disclosed elsewhere herein. Employing a FALE-S scheme, the fBS position information can comprise fixed position information (rather than a position distribution as would be seen in a FALE scheme, see for example FIG. 9). The fBS position information can be employed to weight particles in a particle filter, e.g., starting with the particles correlated to the particle information from 850. The weighted particles can be resampled to normalize particle weights. The particles can then be importance selected, for example, wherein less important particles are removed and more important particles are replicated. The particle filter process can be processed iteratively, such that each pass through the particle filter weights the remaining particles, resamples them, and then applies importance sampling. This can result in the remaining particles having a greater probability of representing the UE location. In an aspect, the FALE-S scheme can have lower computational intensity than a FALE scheme, but can also be associated with less accurate UE location determinations because the fBS fixed positions inherently include error that is not compensated for as it is in the FALE scheme.

At 870, an access to the UE location information determined at 860 can be facilitated. At this point method 800 can end. In an embodiment, access to UE location information can be facilitated for other components or devices that that employing method 800 (not illustrated).

FIG. 9 illustrates a method 900 that facilitates UE location determination based on femto base station position distribution information in accordance with an aspect of the disclosed subject matter. At 910 mBS information can be received. In an embodiment, mBS information can include nearly any type of information relating to a mBS, including time or timing information, time or timing signals, synchronization information or signals, position information (e.g., a location of the mBS), range information, signal strength information, identification information, carrier network information, carrier identification information, etc.

At 920, fBS information can be received. fBS information can include nearly any type of information relating to a fBS, including time or timing information, time or timing signals, synchronization information or signals, position information (e.g., a location of the fBS), network information, range information, signal strength information, identification information, etc.

At 930, fBS location information can be received. In an embodiment, fBS location information can be part of the fBS information received at 920. In another embodiment, fBS location information can be separately received. In an aspect, fBS location information can be information relating to the location of a fBS, such as location information determined by GPS, TDOA, TOA, AOA, etc., for the fBS. The fBS location information can be associated with a degree of error. In another aspect, fBS location information can be determined based on the mBS information received at 910.

At 940, fBS position information can be determined. In an embodiment, the fBS position information can be determined based on the fBS location information from 930. In an aspect, fBS position information can represent position distribution information. Position distribution information can be determined as a range of positions for the fBS as a function of probability, for example, a Gaussian curve of positions for the fBS. As an example, where fBS location information is determined based on GPS measurements, an error of about 3 meters can be assumed. As such, in this example, fBS position information as a position distribution can have a high probability at zero meters and a decreasing probability out to a diameter of 3 meters, with a near zero probability beyond 3 meters.

At 950, particle information for possible UE positions can be determined Particle information can be a set of particles distributed in a model. In an embodiment, particle information can be an initial set of particles, e.g., an entry point for particle filtering techniques. Furthermore, in an embodiment, the particle information can be adapted to represent determined constraints. As an example, where a serving fBS has a transmission radius of 20 meters, the particle information can embody a particle distribution only in the transmission radius area of the serving fBS overlaid with a building envelope, thereby removing particles in areas that would not be covered by the serving fBS or would be outside the building.

At 960, UE location information can be determined. UE location information can be determined based on mBS information received at 910, fBS information received at 920, fBS position information from 940, and particle information from 950. In an aspect, method 900 can employ fBS position information to determine UE location information at 960 by employing a FALE scheme as disclosed elsewhere herein. The fBS position distribution information can be employed to weight particles in a particle filter, e.g., starting with the particles correlated to the particle information from 950. The weighted particles can be resampled to normalize the particle weights. The particles can then be subjected to resampling, wherein less important particles are removed and more important particles are replicated. The particle filter process can be iterative, such that each pass through the particle filter reweights the remaining particles, resamples them, and then applies importance sampling. This can result in a reduction of particles at positions correlating to an area where a UE is unlikely to be located and an increase in particles at positions correlating to areas where a UE has a higher likelihood of being located.

At 970, an access to the UE location information determined at 960 can be facilitated. At this point method 900 can end. In an embodiment, access to UE location information can be facilitated for other components or devices that that employing method 900 (not illustrated).

Example Performance Evaluation

Results of simulations to evaluate the positioning performance of an example FALE scheme and an example FALE-S scheme illustrate beneficial aspects of the disclosed subject matter. The simulations assume a two-dimensional network topology, such as illustrated in FIG. 6, comprising a stationary UE and three fBSs within the indoor environment and three fixed mBSs are located outside. LTE-A specific parameters are also assumed, for example those listed in TABLE 1, for link-level simulation to provide a realistic example LTE-A HetNet environment. The indoor LOS path loss model is adopted in the example simulations for the link between a fBS and the UE. The urban macro model is adopted in the example simulation for the path loss between a mBS and the UE. More specifically, in the example simulations, the extended pedestrian A (EPA) model (light multipath model) is employed to simulate the multipath effect between a fBS and the UE, and the extended typical urban (ETU) model (heavy multipath model) is employed between a mBSs and the UE. A correlation method is adopted to estimate timing sequences. Furthermore, in the example, the results of TOA estimation error is regarded as measurement noise, which is approximated as a Gaussian random variable. Of note, the example measurement error between a mBS to the UE is $\mathcal{N}$ (41.16, 41.52), while $\mathcal{N}$ (1.589, 3.1852) is adopted between a fBS and the UE. Further, according to the example link level simulation for timing estimation, SNR=−5 dB. Moreover, the STD of two different models is utilized in the example particle filter for weighting calculation.

Before estimating the position of UE, the fBS positions are estimated in the example, based on signals from the mBSs over a long period of time. The fBS positions are estimated utilizing a particle filter, e.g., Mote Carlo technique. The estimated coordinates and root mean square error (RMSE) of the fBSs are:

$\hat{x}_{F_1}$=[38.13,34.89],$\hat{\sigma}_{F_1}$=8.51 m, $\hat{x}_{F_2}$=[49.86,60.05],$\hat{\sigma}_{F_2}$=8.99 m, $\hat{x}_{F_3}$=[64.68,45.06],$\hat{\sigma}_{F_3}$=8.49 m with total estimation times A=1000, respectively. Note that the unit of these coordinate is in meters. The RMSE of each assisted fBS can be obtained from:

$$RMSE = \left[\sum_{i=1}^{A} \|x_{F_l}^{(t)} - \hat{x}_{F_l}^{(t)}\| / A\right]^{\frac{1}{2}}. \quad (15)$$

K particles represent the position of $l^{th}$ fBS, the particles are drawn from a normal distribution $\mathcal{N}$ ($\hat{x}_{F_l}, \hat{\sigma}_{F_l}^2$). The UE's true position is chosen randomly in an indoor environment with R=100 meters (see FIG. 6 for the R×R indoor area), and the initial particles corresponding to a possible UE location are spread out in a R×R area uniformly. The path between a mBSs and the UE are considered NLOS due to the effect of wall separation; while the path between a fBSs and the UE are considered LOS. Of note, in this particular example, the number of particles employed for pre-determining the position of the fBSs (e.g., an 'assisted fBS'), as given in this example hereinabove, are the same number of particles used to determine the UE location with the FALE scheme. It will be further noted that the subject disclosure is not so limited and different numbers of particles can be employed in determining assisted fBS than that used to determine UE location information.

TABLE 1

EXAMPLE LINK-LEVEL SIMULATION PARAMETERS

| Parameter | Value |
|---|---|
| System bandwidth | 10 MHz |
| Carrier frequency | 2.5 GHz |
| Number of non-coherent accumulations | 50 |
| Sampling frequency | 15.36 MHZ |
| mBS transmission power | 46 dBm |
| fBS transmission power | 20 dBm |
| mBS to MS shadowing STD | 10 |
| fBS to MS shadowing STD | 3 |

Four example cases $\{C_c|c=0, 1, 2, 3\}$ are studied for the FALE scheme, with c being the number of assisted fBSs. The FALE scheme and FALE-S scheme are compared with a typical Cell ID method. The Cell ID method can adopt the serving fBS position as the location estimation for UE (which is also associated with an error relative to the transmission radius of the fBS). The sampling time interval for the example simulation time is 0.5 msec, which is set as the length of a resource block in a typical LTE-A system. The number of simulation trials is selected to be P=1000. Moreover, the total observation time is selected as T=30 msec.

Figure 10:
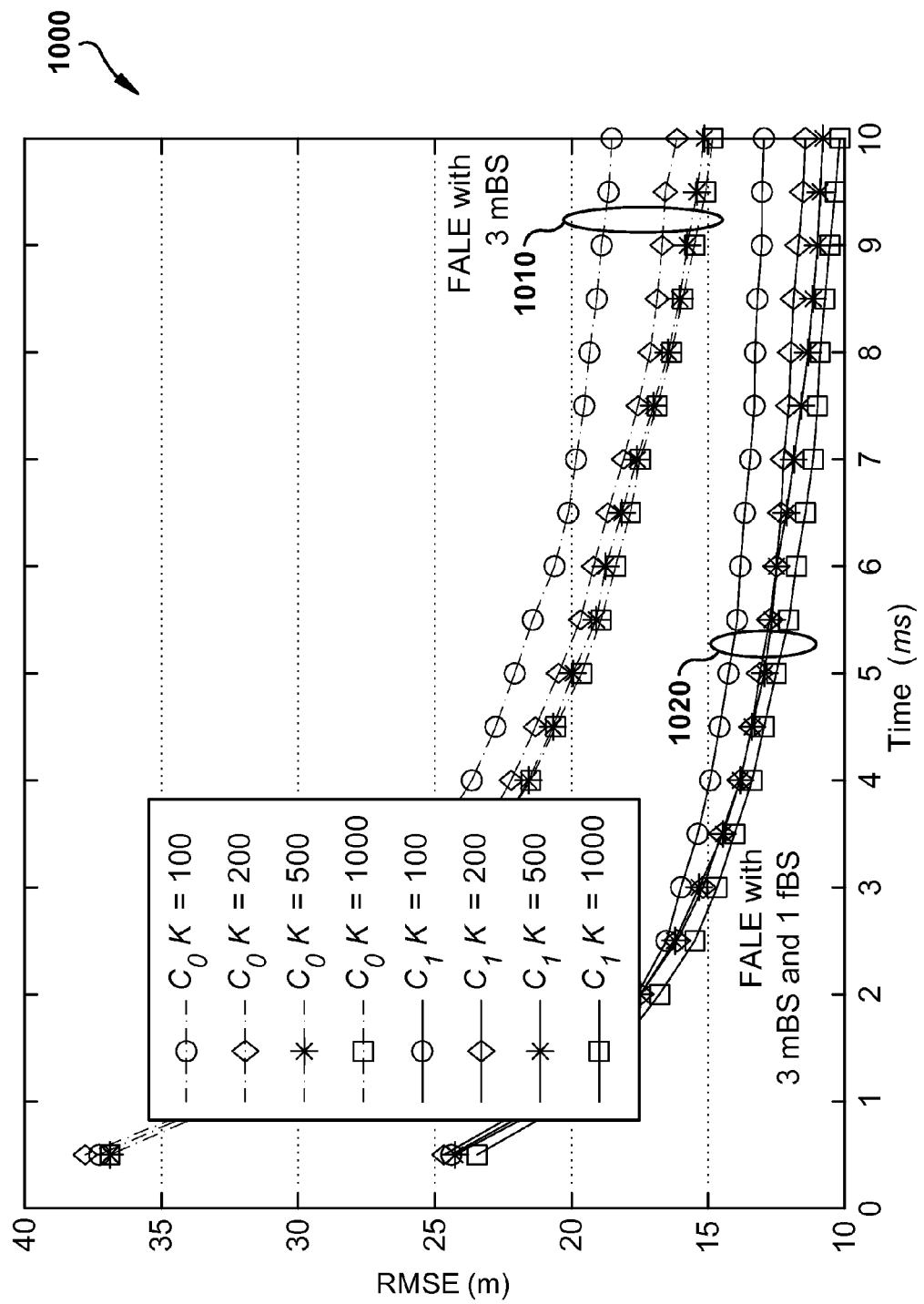
FIG. 10 illustrates example simulation results for femto-assisted location estimation in accordance with an aspect of the disclosed subject matter.

As illustrated in the present disclosure, the estimation accuracy of a particle filter correlates closely with the number of particles, wherein the estimation performance of a particle filter approaches the optimum Bayesian estimation as number of particles approaches infinity. However, the computational burden also increases with number of particles. As such, it can be important to balance the number of particles against desired performance. In FIG. 10, the RMSE of an example FALE scheme simulation with different numbers of particles is illustrated, in accordance with an aspect of the subject matter disclosed herein. As shown in FIG. 10, better performance can be achieved if more particles are utilized. It can be observed that the particle numbers K=500 and K=1000 possess similar performance in terms of RMSE under both $C_0$ and $C_1$ cases. Therefore, considering the tradeoff between computation intensity and location determination performance error, the particle number K=500 is selected for the example simulations.

Figure 11:
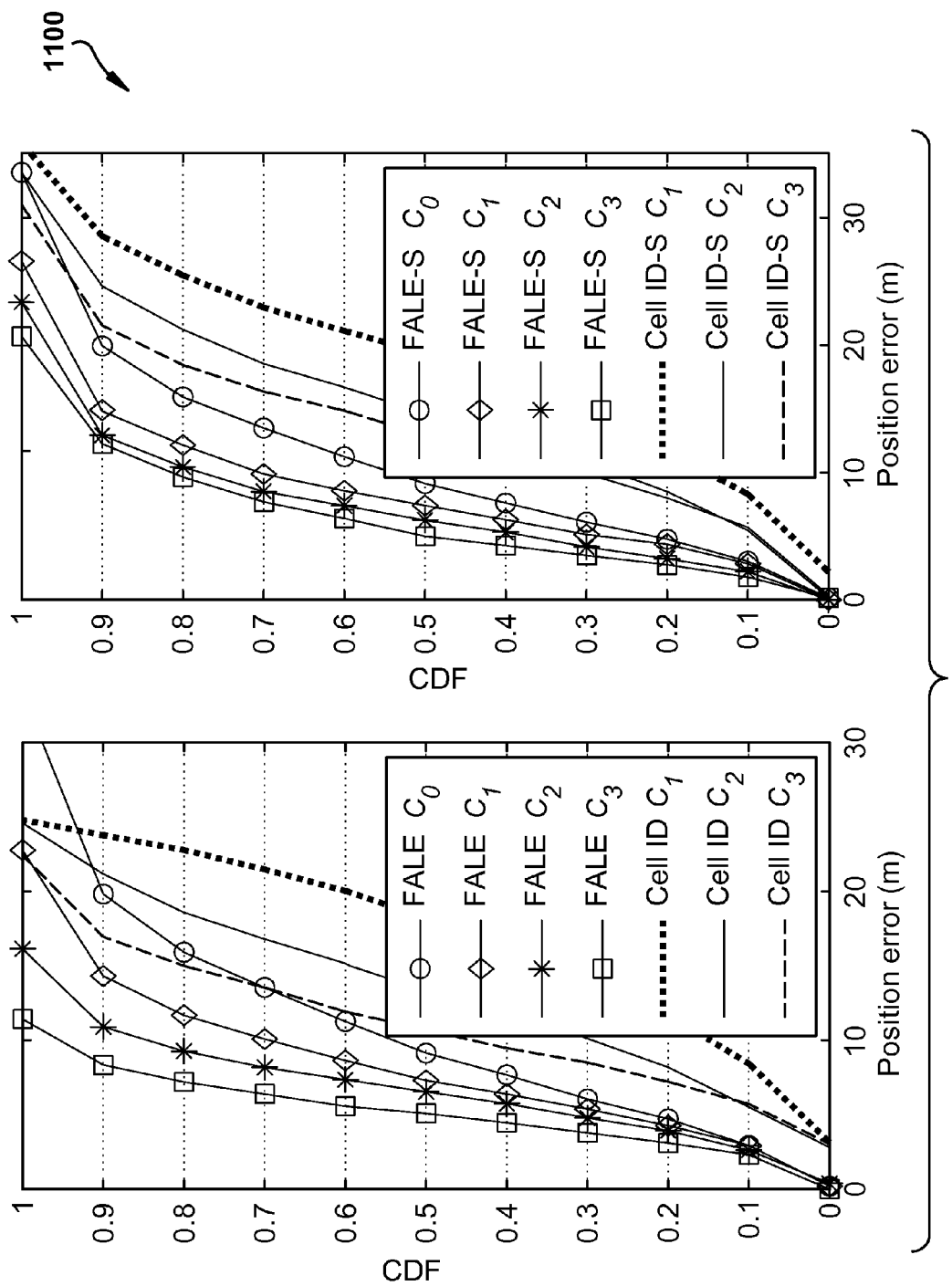
FIG. 11 illustrates example comparative simulation results for femto-assisted location estimation with different numbers of assisted femto base station positions in accordance with an aspect of the disclosed subject matter.

In FIG. 11, the performances of a FALE scheme and a FALE-S scheme, in accordance with an aspect of the disclosed subject matter, are compared with corresponding example Cell ID scheme results. Of note, the performance is evaluated against the cumulative distribution function (CDF) of position errors. Of further note, the example Cell ID scheme and Cell ID-S scheme each provide different fBS coordinates to be employed in the estimation of the UE location. In the FALE scheme example results, 1000 position estimates of an fBS are collected, statistics such as mean and STD are then obtained from the position estimates. These statistics can represent the position information as assisted fBS information. Turning to the fBSs position information from the example FALE-S scheme, position estimates are captured at each iteration as a fixed position, such that the location information in each simulation trail becomes different. It can be seen from FIG. 11 that larger number of assisted fBSs can provide better improvement for UE location determination as compared to the cases with fewer number of assisted fBSs. Moreover, the performance of the example FALE scheme and the FALE-S scheme is better than the example Cell ID and Cell ID-S schemes, respectively.

Figure 12:
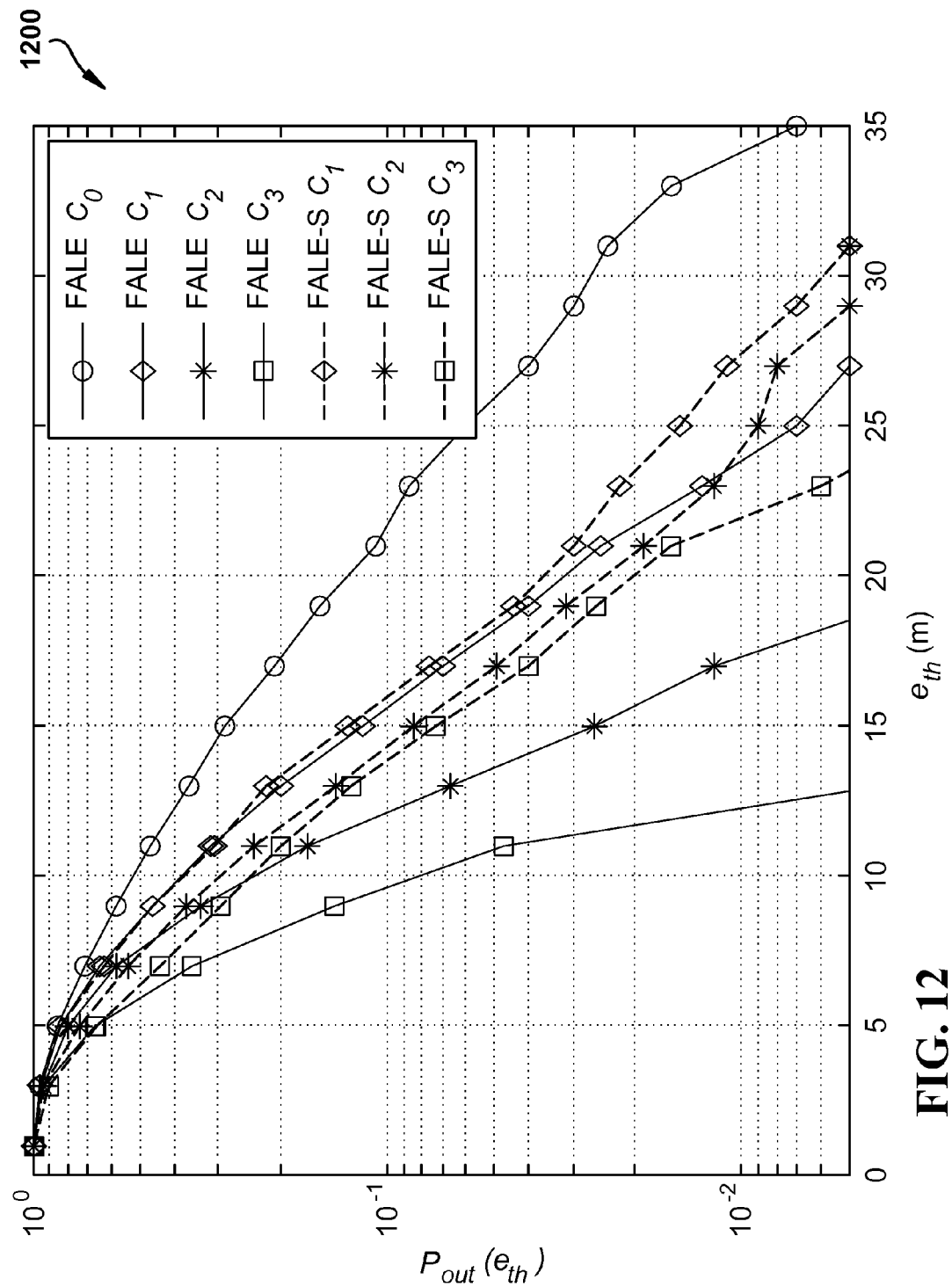
FIG. 12 is an illustration of example simulation results for femto-assisted location estimation with different numbers of assisted femto base station positions in accordance with an aspect of the disclosed subject matter.

In FIG. 12, the performance of the FALE scheme and the FALE-S scheme, in accordance with an aspect of the disclosed subject matter, can be compared in terms of the metric of outage probability which can be denoted by:

$$P_{out}(e_{th}) = E\{I|\|x^{(t)} - \hat{x}^{(t)}\| > e_{th}\},$$

where $e_{th}$ is the allowable position error and $I(\bullet)$ is the indicator function as:

$$I(\cdot) = \begin{cases} 1 & \text{if } \|x^{(t)} - \hat{x}^{(t)}\| > e_{th} \\ 0 & \text{if } \|x^{(t)} - \hat{x}^{(t)}\| \leq e_{th}. \end{cases} \quad (17)$$

FIG. 12 illustrates that the outage probability of the example FALE scheme is less than that of the example FALE-S scheme in all the cases with different numbers of assisted fBSs (e.g., $C_0$ to $C_3$). This can imply that it can be effective to consider the uncertainty of coordinates for an assisted fBS as a spread distribution for UE location estimation. However, even with degenerated positioning performance, the example FALE-S scheme can provide reduced computation cost for obtaining reasonably accurate UE location information.

Figure 13:
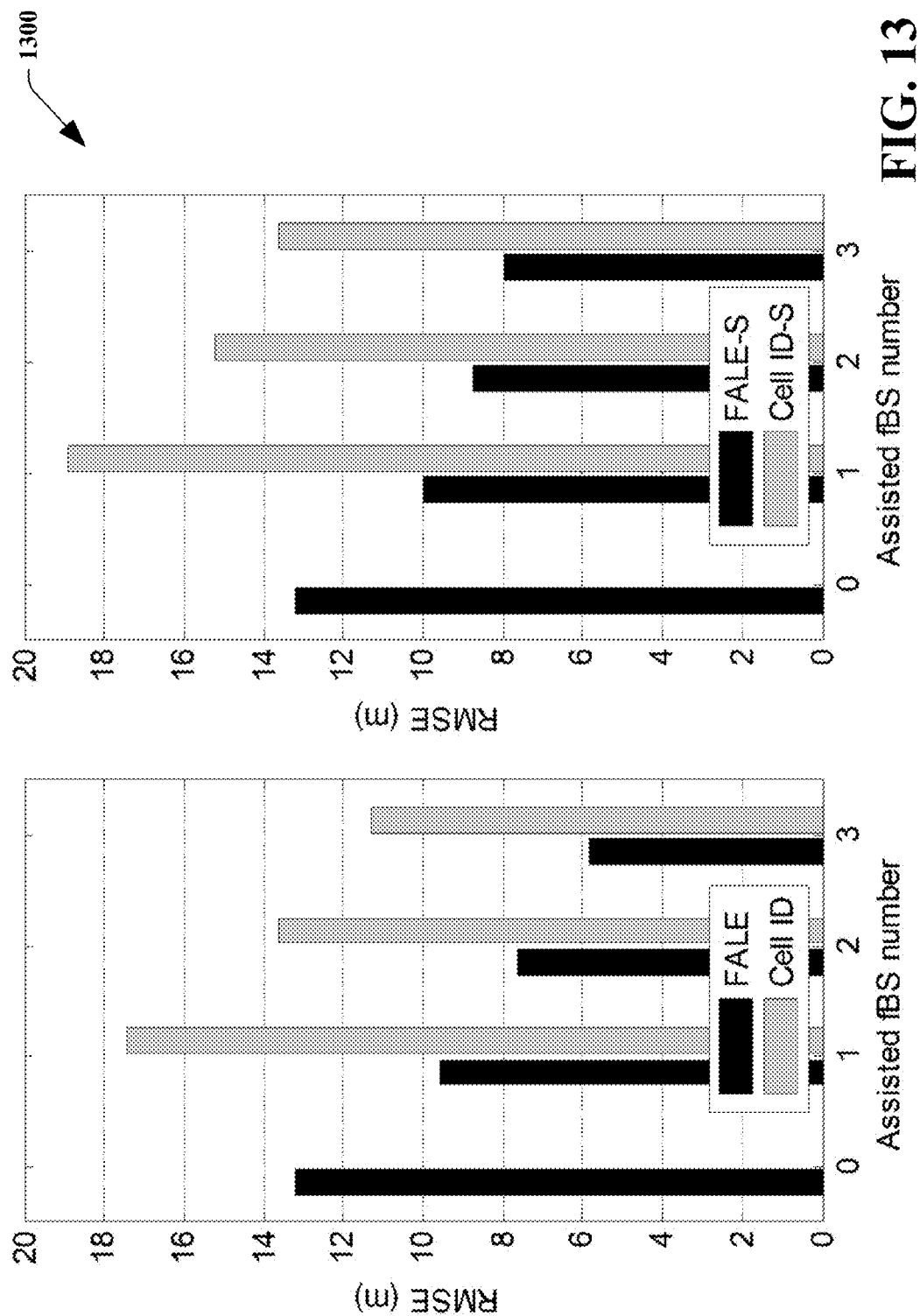
FIG. 13 illustrates example comparative simulation results for femto-assisted location estimation in accordance with an aspect of the disclosed subject matter.

FIG. 13 shows the RMSEs of an example FALE scheme and example FALE-S scheme, in accordance with an aspect of the disclosed subject matter, compared to example Cell ID and Cell ID-S schemes, respectively. Similar to the results in FIG. 11, better UE location determination performance can be achieved as the number of assisted fBSs increases. This can indicate a benefit of using assisted fBSs even though these fBSs can possess uncertain positions, as illustrated by the corresponding fBS position distribution information.

Figure 14:
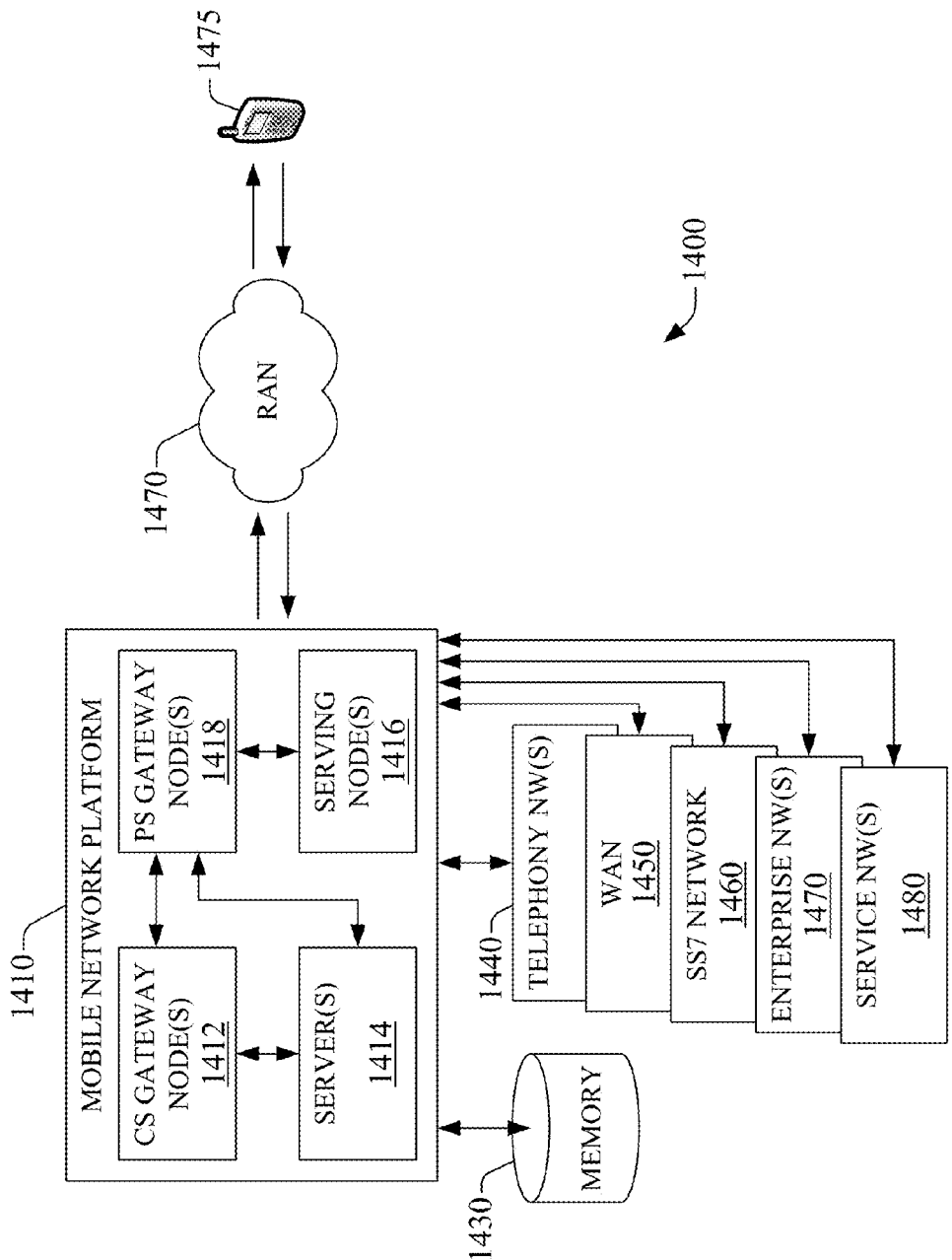
FIG. 14 is a block diagram of an exemplary embodiment of a mobile network platform to implement and exploit various features or aspects of the subject disclosure.

FIG. 14 presents an example embodiment 1400 of a mobile network platform 1410 that can implement and exploit one or more aspects of the subject innovation described herein. Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, aspects of wireless network platform 1410 can be included in telecommunications carrier network components, such as an mBS or fBS as illustrated, e.g., see FIG. 6, and discussed elsewhere herein. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1470; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication.

In addition to receiving and processing CS-switched traffic and signaling, PS gateway node(s) 1418 can authorize and authenticate PS-based data sessions with served mobile devices. Data sessions can include traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1460 can embody, at least in part, a service network(s) like IP multimedia subsystem (IUE). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN). As another example, in a LTE network, serving node(2) 1416 can be embodied in mobility management entity (MME) node(s).

For radio technologies that exploit packetized communication, server(s) 1414 in wireless network platform 1410 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS)

network(s) (not shown). Provisioning server(s) can also provision coverage through networks associated to wireless network platform 1410 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 1414 can include one or more processors configured to confer at least in part the functionality of macro network platform 1410. To that end, the one or more processor can execute code instructions stored in memory 1430, for example. It is should be appreciated that server(s) 1414 can include a content manager 1415, which operates in substantially the same manner as described hereinbefore.

In example embodiment 1400, memory 1430 can store information related to operation of wireless network platform 1410. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1460, or SS7 network 1470. In an aspect, memory 1430 can be, for example, accessed as part of a data store component or as a remotely connected memory store.

Figure 15:
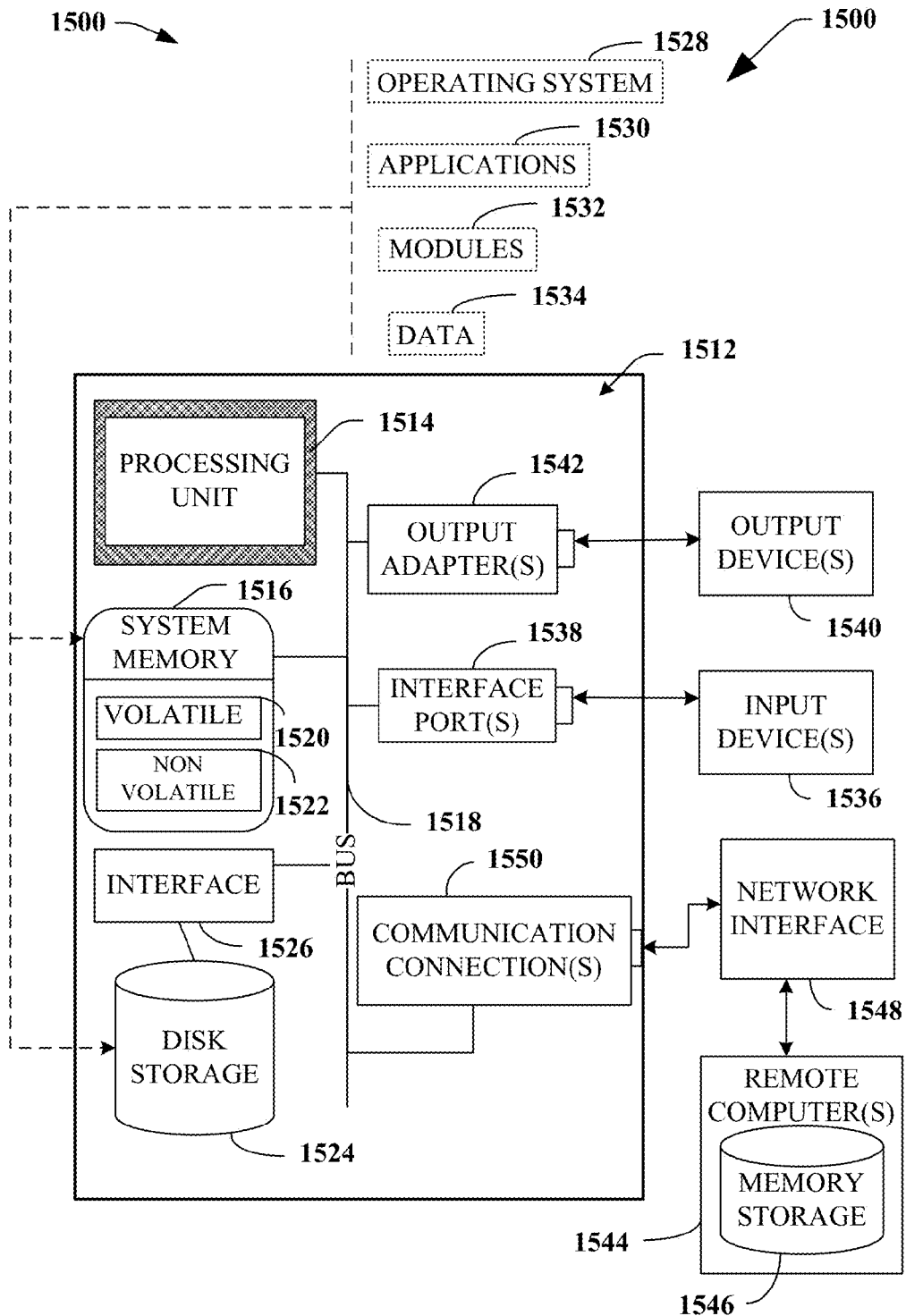
FIG. 15 illustrates a block diagram of a computing system operable to execute the disclosed systems and methods in accordance with an embodiment.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, part of the hardware of FALE component (e.g., 110, 221, 310, etc.), FALE-S component (e.g., 412), mBS devices or fBS devices (e.g., mBS1, mBS2, mBS3, fBS1, fBS2, fBS3, etc.), includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1516 can include volatile memory 1520 and nonvolatile memory 1522. A basic input/output system, containing routines to transfer information between elements within computer 1512, such as during start-up, can be stored in nonvolatile memory 1522. By way of illustration, and not limitation, nonvolatile memory 1522 can include read only memory, programmable read only memory, electrically programmable read only memory, electrically erasable read only memory, or flash memory. Volatile memory 1520 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, a user interface can be embodied in a touch sensitive display panel allowing a user to interact with computer 1512, e.g., focus state information is determined from input into a device. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus, an infrared port, a Bluetooth port, an IP port, or a logical port associated with a wireless service, etc. Output device(s) 1540 use some of the same type of ports as input device(s) 1536.

Thus, for example, a universal serial busport can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femto-cell technology; Wi-Fi; worldwide interoperability for microwave access; enhanced general packet radio service; third generation partnership project, long term evolution; third generation partnership project universal mobile telecommunications system; third generation partnership project 2, long term evolution (LTE), advanced long term evolution (LTE-A), ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory to store instructions; and
   a processor, coupled to the memory, that facilitates execution of the instructions to perform operations, the operations comprising:
   receiving base station information related to a user equipment;
   receiving particle information for a first set of particles corresponding to possible user equipment locations and embodying at least one latent variable of a state space; and
   determining user equipment location information based on a first particle filtering applied to the first set of particles, wherein particle filtering comprises determining a distribution of the at least one latent variable at a time specified in a defined state space.

2. The system of claim 1, wherein the receiving the base station information comprises receiving macro base station information.

3. The system of claim 1, wherein the receiving the base station information comprises receiving femto base station information.

4. The system of claim 1, wherein the base station information comprises macro base station timing information related to determining a position of a femto base station device.

5. The system of claim 4, wherein the determining the position of the femto base station device is based on time of arrival measurements.

6. The system of claim 1, wherein the receiving the base station information comprises receiving a set of information related to a distribution of possible positions of a femto base station device.

7. The system of claim 1, the operations further comprising:
   determining information related to a distribution of possible positions of a femto base station device based on the base station information.

8. The system of claim 7, wherein the determining the information is further based on a second particle filtering of a second set of particles corresponding to possible femto base station device locations.

9. The system of claim 7, wherein the determining the set of information facilitates determining a mean position value of the femto base station device.

10. The system of claim 7, wherein the determining the set of information facilitates determining a standard deviation for a mean position value of the femto base station device.

11. The system of claim 1, wherein the operations further comprise:
    receiving information related to a distribution of possible positions of a femto base station device.

12. The system of claim 11, wherein the determining the user equipment location information is further based on the information, and the first particle filtering comprises importance sampling of a particle comprised in the first set of particles, the importance sampling results in a second set of particles being generated based on an importance distribution.

13. The system of claim 12, wherein the first particle filtering further comprises a mathematical weighting of a particle of the second set of particles based on the distribution of possible positions of the femto base station device, and the mathematical weighting results in a third set of particles being generated.

14. The system of claim 13, wherein the first particle filtering further comprises resampling of a particle of the third set of particles resulting in a reduced degeneracy of the third set of particles by removing a low importance particle or emphasizing a high importance particle, and the resampling further results in a fourth set of particles being generated.

15. The system of claim 14, wherein the first particle filtering updates the first set of particles by replacing the first set of particles with the fourth set of particles, resulting in an updated first set of particles, and the operations further comprise importance sampling of a particle comprised in the updated first set of particles to result in an updated second set of particles being generated.

16. The system of claim 15, wherein the first particle filtering further comprises, for a determined number of iterations:
    weighting a particle of the updated second set of particles to result in an updated third set of particles being generated;
    resampling a particle of the updated third set of particles to result in an updated fourth set of particles being generated; and
    updating the updated first set of particles by replacing the updated first set of particles with the updated fourth set of particles, resulting in a further updated first set of particles, and importance sampling of a particle comprised in the further updated first set of particles to result in a further updated second set of particles.

17. The system of claim 1, the operations further comprising:
receiving information related to a possible position of a femto base station device; and
the determining the user equipment location information is further based on the information and the first particle filtering comprises an importance sampling of a particle comprised in the first set of particles, the importance sampling results in a second set of particles being generated.

18. The system of claim 17, wherein the first particle filtering further comprises mathematical weighting of a particle based on the possible position of the femto base station device, the particle comprised in the second set of particles, and the mathematical weighting results in a third set of particles being generated.

19. The system of claim 18, wherein the first particle filtering further comprises resampling of a particle of the third set of particles resulting in a uniform distribution of the third set of particles with reduced degeneracy, and the resampling further results in a fourth set of particles being generated.

20. The system of claim 19, wherein the first particle filtering updates the first set of particles by replacing the first set of particles with the fourth set of particles, resulting in an updated first set of particles, and the operations further comprise importance sampling of a particle comprised in the updated first set of particles to result in an updated second set of particles being generated.

21. The system of claim 20, wherein the first particle filtering further comprises, for a determined number of iterations:
weighting a particle of the updated second set of particles to result in an updated third set of particles being generated;
resampling a particle of the updated third set of particles to result in an updated fourth set of particles being generated; and
updating the updated first set of particles by replacing the updated first set of particles with the updated fourth set of particles, resulting in a further updated first set of particles, and importance sampling of a particle comprised in the further updated first set of particles to result in a further updated second set of particles.

22. A computer-readable storage medium having computer-executable instructions that, in response to execution, cause a computing device including a processor to perform operations, comprising:
receiving femto base station timing information related to a user equipment;
receiving macro base station timing information related to the user equipment;
receiving particle information for a first set of particles corresponding to possible user equipment locations;
receiving femto base station position information; and
determining user equipment location information based on a first particle filtering applied to the first set of particles, the first particle filtering employing the femto base station timing information and the macro base station timing information.

23. The computer-readable storage medium of claim 22, wherein the receiving the femto base station position information comprises receiving femto base station position distribution information or receiving femto base station estimated position information.

24. The computer-readable storage medium of claim 22, the operations further comprising:
receiving macro base station information related to a femto base station device; and
determining the femto base station position information based on the macro base station information and wherein the first particle filtering further employs the femto base station position information.

25. The computer-readable storage medium of claim 24, wherein the femto base station position information is position distribution information and is determined by a second particle filtering.

26. The computer-readable storage medium of claim 22, the operations further comprising:
receiving information related to a distribution of possible positions of a femto base station device.

27. The computer-readable storage medium of claim 26, wherein the determining user equipment location information is further based on the information and the first particle filtering comprises importance sampling of a particle comprised in the first set of particles, the importance sampling results in a second set of particles being generated, and the first particle filtering further comprises weighting of a particle of the second set of particles based on the information resulting in a third set of particles being generated.

28. The computer-readable storage medium of claim 27, wherein the first particle filtering further comprises a fourth set of particles being generated and resampling of a particle of the third set of particles resulting in uniform distribution of the third set embodied in the fourth set of particles.

29. The computer-readable storage medium of claim 28, wherein the first particle filtering updates the first set of particles by replacing the first set of particles with the fourth set of particles, resulting in an updated first set of particles, and the operations further comprise importance sampling of a particle comprised in the updated first set of particles to result in an updated second set of particles being generated.

30. A method, comprising:
receiving femto base station timing information related to a user equipment;
receiving macro base station timing information related to the user equipment;
receiving particle information for a first set of particles corresponding to possible user equipment locations;
receiving femto base station position information; and
determining user equipment location information based on a first particle filtering for particle filtering the first set of particles based on the base station information.

31. The method of claim 30, wherein the femto base station position information comprises position distribution information related to a position of a femto base station device and the position distribution information is determined by a second particle filtering of particles corresponding the position of the femto base station device.

32. The method of claim of claim 30, wherein the receiving femto base station position information comprises receiving position estimation information, and the determining the user equipment location information is further based on the position estimation information, the first particle filtering comprises importance sampling of a particle comprised in the first set of particles and results in a second set of particles being generated.

33. The method of claim of claim 32, wherein the first particle filtering further comprises weighting of a particle of the second set of particles based on the position estimation information, and results in a third set of particles being generated.

34. The method of claim of claim 33, wherein the first particle filtering further comprises resampling of a particle of the third set of particles, generating a fourth set of particles, and results in uniform distribution of the particles of the third set of particles in the fourth set of particles.

35. The method of claim of claim 34, wherein the first particle filtering updates the first set of particles by replacing the first set of particles with the fourth set of particles, resulting in an updated first set of particles, and the operations further comprise importance sampling a particle of the updated first set of particles to result in an updated second set of particles being generated.

36. A system, comprising:
 means for receiving first macro base station information related to a user equipment;
 means for receiving femto base station information related to a user equipment;
 means for receiving second macro base station information related to a possible position of a femto base station device;
 means for determining femto base station position information based on a first particle filtering of a first set of particles corresponding to the second macro base station information;
 means for receiving particle information for a second set of particles corresponding to possible user equipment locations; and
 means for determining, by time difference of arrival information, user equipment location information based on a second particle filtering of the second set of particles based on the first macro base station information, femto base station information, and the femto base station position information.

37. The system of claim 36 wherein the femto base station position information comprises femto base station position distribution information or femto base station position estimation information.

* * * * *